United States Patent
Chang et al.

(10) Patent No.: US 8,644,417 B2
(45) Date of Patent: Feb. 4, 2014

(54) METHODS AND SYSTEMS FOR MULTI-LEVEL DATA TRANSMISSION

(75) Inventors: Rung-Yuan Chang, Hsinchu (TW); Chun-Fan Chung, Hsinchu (TW)

(73) Assignee: AU Optronics Corporation, Hsinchu (TW)

(*) Notice: Subject to any disclaimer, the term of this patent is extended or adjusted under 35 U.S.C. 154(b) by 11 days.

(21) Appl. No.: 13/466,607

(22) Filed: May 8, 2012

(65) Prior Publication Data

US 2013/0301750 A1 Nov. 14, 2013

(51) Int. Cl.
*H04L 25/49* (2006.01)

(52) U.S. Cl.
USPC .......................................................... 375/286

(58) Field of Classification Search
None
See application file for complete search history.

(56) References Cited

U.S. PATENT DOCUMENTS

| | | | |
|---|---|---|---|
| 4,489,417 A | 12/1984 | Askin et al. | |
| 4,910,750 A * | 3/1990 | Fisher | 375/292 |
| 5,166,956 A * | 11/1992 | Baltus et al. | 375/286 |
| 6,114,979 A * | 9/2000 | Kim | 341/57 |
| 7,206,876 B2 * | 4/2007 | Jang | 710/66 |
| 2009/0051675 A1* | 2/2009 | Huang | 345/204 |
| 2011/0102208 A1* | 5/2011 | Terashima | 341/67 |

* cited by examiner

*Primary Examiner* — David C. Payne
*Assistant Examiner* — Bahman Badipour
(74) *Attorney, Agent, or Firm* — Morris, Manning & Martin, LLP; Tim Tingkang Xia, Esq.

(57) ABSTRACT

A method for multi-level data transmission includes encoding a data signal to be transmitted into N multi-level signals in accordance with an encoding table, where the data signal is characterized with a stream of binary data segments each of which has a data length of M bits, transmitting simultaneously the N multi-level signals through N data transmission channels, respectively; and decoding the N multi-level signals into the data signal by comparing each two of the N multi-level signals transmitted through the two data transmission channels to obtain a respective bit of the M bits of each binary data segment of the data signal based on comparison between the two corresponding multi-level signals.

16 Claims, 25 Drawing Sheets

| ENCODING TABLE | | | | | DECODING TABLE | | |
|---|---|---|---|---|---|---|---|
| DEC | BIN | A | B | C | A-B | B-C | C-A |
| 0 | 00 | -1 | 0 | 1 | 0 | 0 | 1 |
| 1 | 01 | -1 | 1 | 0 | 0 | 1 | 1 |
| 2 | 10 | 1 | -1 | 0 | 1 | 0 | 0 |
| 3 | 11 | 1 | 0 | -1 | 1 | 1 | 0 |
| Command#1 | | 0 | 1 | -1 | 0 | 1 | 0 |
| Command#2 | | 0 | -1 | 1 | 1 | 0 | 1 |

| DEC | BIN | A | B | C | a | b | c | d | e | f |
|---|---|---|---|---|---|---|---|---|---|---|
| 0 | 00 | -1 | 0 | 1 | H | L | L | L | L | H |
| 1 | 01 | -1 | 1 | 0 | H | L | L | L | H | L |
| 2 | 10 | 1 | -1 | 0 | L | H | L | H | L | L |
| 3 | 11 | 1 | 0 | -1 | L | L | H | H | L | L |
| Command#1 | | 0 | 1 | -1 | L | L | H | L | H | L |
| Command#2 | | 0 | -1 | 1 | L | H | L | L | L | H |

| | ENCODING TABLE | | | | | | DECODING TABLE | | | | | | |
|---|---|---|---|---|---|---|---|---|---|---|---|---|---|
| DEC | BIN | A | B | C | D | | A-B | A-C | A-D | XOR | B-C | B-D | C-D |
| 0 | 0000 | -3 | -1 | 1 | 3 | | 0 | 0 | 0 | 0 | 0 | 0 | 0 |
| 1 | 0001 | -3 | 1 | -1 | 3 | | 0 | 0 | 0 | 1 | 1 | 0 | 0 |
| 2 | 0010 | -1 | 1 | 3 | -3 | | 0 | 0 | 1 | 1 | 0 | 1 | 1 |
| 3 | 0011 | -1 | 3 | 1 | -3 | | 0 | 0 | 1 | 0 | 1 | 1 | 1 |
| 4 | 0100 | -1 | 3 | -3 | 1 | | 0 | 1 | 0 | 1 | 0 | 0 | 0 |
| 5 | 0101 | -1 | 1 | -3 | 3 | | 0 | 1 | 0 | 0 | 0 | 0 | 0 |
| 6 | 0110 | 1 | 3 | -3 | -1 | | 0 | 1 | 1 | 0 | 0 | 1 | 0 |
| 7 | 0111 | 1 | 3 | -1 | -3 | | 0 | 1 | 1 | 1 | 0 | 1 | 1 |
| 8 | 1000 | -1 | -3 | 1 | 3 | | 1 | 0 | 0 | 1 | 0 | 0 | 0 |
| 9 | 1001 | -1 | -3 | 3 | 1 | | 1 | 0 | 0 | 0 | 0 | 0 | 1 |
| 10 | 1010 | 1 | -3 | 3 | -3 | | 1 | 0 | 1 | 0 | 0 | 1 | 1 |
| 11 | 1011 | 1 | -3 | 3 | -1 | | 1 | 0 | 1 | 1 | 0 | 1 | 1 |
| 12 | 1100 | 1 | -3 | -1 | 3 | | 1 | 1 | 0 | 0 | 0 | 0 | 0 |
| 13 | 1101 | 1 | -1 | -3 | 3 | | 1 | 1 | 0 | 1 | 0 | 0 | 0 |
| 14 | 1110 | 3 | -1 | 1 | -3 | | 1 | 1 | 1 | 1 | 0 | 1 | 1 |
| 15 | 1111 | 3 | 1 | -3 | -1 | | 1 | 1 | 1 | 0 | 0 | 1 | 1 |
| Command #1 | | -3 | 1 | 3 | -1 | | 0 | 0 | 0 | 0 | 0 | 1 | 1 |
| Command #2 | | -3 | 3 | 1 | -1 | | 0 | 0 | 0 | 1 | 1 | 1 | 1 |
| Command #3 | | -3 | 3 | -1 | 1 | | 0 | 0 | 0 | 0 | 1 | 1 | 0 |
| Command #4 | | -3 | -1 | 3 | 1 | | 0 | 1 | 1 | 1 | 0 | 0 | 1 |
| Command #5 | | 3 | 1 | -3 | -1 | | 1 | 1 | 1 | 0 | 1 | 1 | 0 |
| Command #6 | | 3 | -3 | 1 | -1 | | 1 | 1 | 1 | 1 | 0 | 0 | 1 |
| Command #7 | | 3 | -3 | -1 | 1 | | 1 | 1 | 1 | 0 | 0 | 0 | 0 |
| Command #8 | | 3 | -1 | -3 | 1 | | 1 | 1 | 1 | 1 | 1 | 0 | 0 |

FIG. 7

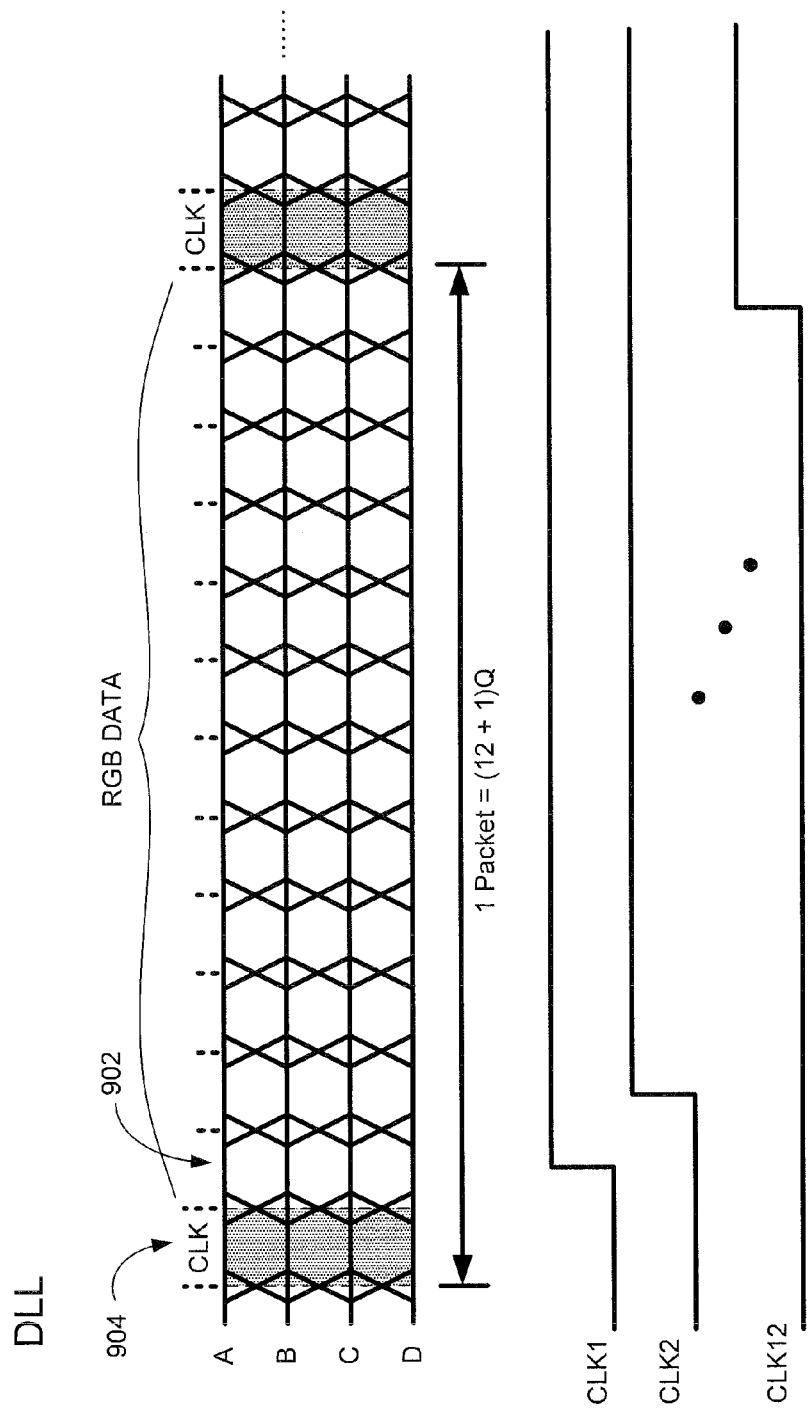

FIG. 12

| | | | ENCODING TABLE | | | | DECODING TABLE | | | | | | |
|---|---|---|---|---|---|---|---|---|---|---|---|---|---|
| Polarity | DEC | BIN | A | B | C | D | A-B | A-C | A-D | B-C | B-D | C-D | XOR |
| - | 0 | 000 | -3 | -1 | 1 | 3 | 0 | 0 | 0 | 0 | 0 | 0 | 0 |
| + | 0 | 000 | -3 | 1 | -1 | 3 | 0 | 0 | 0 | 1 | 0 | 0 | 1 |
| - | 1 | 001 | -1 | 1 | 3 | -3 | 0 | 0 | 1 | 0 | 1 | 1 | 0 |
| + | 1 | 001 | -1 | 1 | -3 | 3 | 0 | 0 | 1 | 0 | 1 | 1 | 1 |
| - | 2 | 010 | -1 | 3 | -3 | 1 | 0 | 1 | 0 | 1 | 1 | 0 | 0 |
| + | 2 | 010 | -1 | 3 | -3 | 1 | 0 | 1 | 0 | 1 | 1 | 0 | 1 |
| - | 3 | 011 | 1 | 3 | -3 | -1 | 0 | 1 | 1 | 1 | 0 | 0 | 0 |
| + | 3 | 011 | 1 | 3 | -1 | -3 | 0 | 1 | 1 | 1 | 0 | 1 | 1 |
| - | 4 | 100 | -1 | -3 | 1 | 3 | 1 | 0 | 0 | 0 | 1 | 1 | 0 |
| + | 4 | 100 | -1 | -3 | 3 | 1 | 1 | 0 | 0 | 0 | 1 | 1 | 1 |
| - | 5 | 101 | 1 | -3 | 3 | -1 | 1 | 0 | 1 | 0 | 1 | 0 | 0 |
| + | 5 | 101 | 1 | -3 | -1 | 3 | 1 | 0 | 1 | 1 | 0 | 1 | 1 |
| - | 6 | 110 | 1 | -1 | 3 | -3 | 1 | 1 | 0 | 0 | 0 | 1 | 0 |
| + | 6 | 110 | 1 | -1 | -3 | 3 | 1 | 1 | 0 | 0 | 0 | 1 | 1 |
| - | 7 | 111 | 3 | -1 | 1 | -3 | 1 | 1 | 1 | 0 | 0 | 0 | 0 |
| + | 7 | 111 | 3 | 1 | -1 | -3 | 1 | 1 | 1 | 1 | 1 | 0 | 1 |
| - | Command #1 | | -3 | 1 | 3 | -1 | 0 | 0 | 0 | 0 | 1 | 1 | 0 |
| + | Command #1 | | -3 | 3 | 1 | -1 | 0 | 0 | 0 | 1 | 1 | 1 | 1 |
| - | Command #2 | | -3 | 3 | -1 | 1 | 0 | 0 | 0 | 1 | 1 | 0 | 0 |
| + | Command #2 | | -3 | 3 | 1 | -1 | 0 | 0 | 0 | 1 | 1 | 1 | 1 |
| - | Command #3 | | 3 | 1 | -3 | -1 | 1 | 1 | 1 | 1 | 1 | 0 | 0 |
| + | Command #3 | | 3 | -3 | 1 | -1 | 1 | 1 | 1 | 0 | 1 | 1 | 1 |
| - | Command #4 | | 3 | -3 | -1 | 1 | 1 | 1 | 1 | 0 | 0 | 0 | 0 |
| + | Command #4 | | 3 | -1 | -3 | 1 | 1 | 1 | 1 | 0 | 0 | 0 | 1 |

METHODS AND SYSTEMS FOR MULTI-LEVEL DATA TRANSMISSION

TECHNICAL FIELD

The disclosure generally relates to data transmission, and more particularly to methods and systems that utilize multiple multi-level signals to transmit a binary data signal.

BACKGROUND OF THE INVENTION

In recent years, display technology has rapidly developed to satisfy the consumer needs, such as three-dimensional (3D) video imaging, digital cinema resolution, or smart TV that combines regular TV and the Internet. To achieve the requirements of high resolution and high amplitude velocity image, data transmission is critical for the increasingly huge amount of image data being transferred. However, with the requirement of compact-sized products of the display panel, circuitry design on the panel is limited, which affects the transmission quality.

Generally, with a huge amount of data to be transferred, the data can be encoded to increase the bandwidth of data transmission. A typical way of high speed data transmission is to convert the data to be transmitted to encoded multi-level signals. Thus, transmission of the encoded multi-level signals would be more efficient than transmission of the original data. For example, a data with the length of two bits can be encoded or converted to a quaternary level signal, which refers to a signal with 4 different levels. Thus, transmission of the quaternary level signal would be more efficient than transmission of the two bits of the original data. When the receiving terminal receives the quaternary level signal, it can be decoded to obtain the original data with the two bits.

When the encoded multi-level signals are used for data transmission, however, it is difficult to determine each signal level of the multi-level signals. For example, if data with the length of two bits is encoded to the quaternary level signal, which has four different signal levels, the signal stream of the quaternary level signals has no reference to the four different signal levels, and errors may occur if the decoder misjudge one of the signal levels to another. Thus, additional reference voltage can be provided as the reference signal for the multi-level signals, which increases the complexity of the circuitry design.

Further, when encoded multi-level signals are used for data transmission, mapping (encoding and decoding) of the data generally would be one-to-one correspondence. For example, each of the four different signal level of a quaternary level signal corresponds to one of the four combinations of a data with two bits. However, the one-to-one correspondence leaves no space for other command signals, such as clock signaling information, to be transmitted along with the encoded data stream. Thus, additional signals are required for these commands, which increase the complexity of the circuitry design.

Therefore, a heretofore unaddressed need exists in the art to address the aforementioned deficiencies and inadequacies.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein:

FIG. 7 shows schematically a 4B1Q table of the quaternary permutations of the four quaternary level data according to one embodiment of the present invention;

FIG. 9A shows schematically a diagram of the 4B1Q DLL embedded clock signaling according to one embodiment of the present invention;

FIG. 12 shows schematically a 3B1Q table of the quaternary permutations of the four quaternary level data according to one embodiment of the present invention;

DETAILED DESCRIPTION OF THE INVENTION

Figure 1:
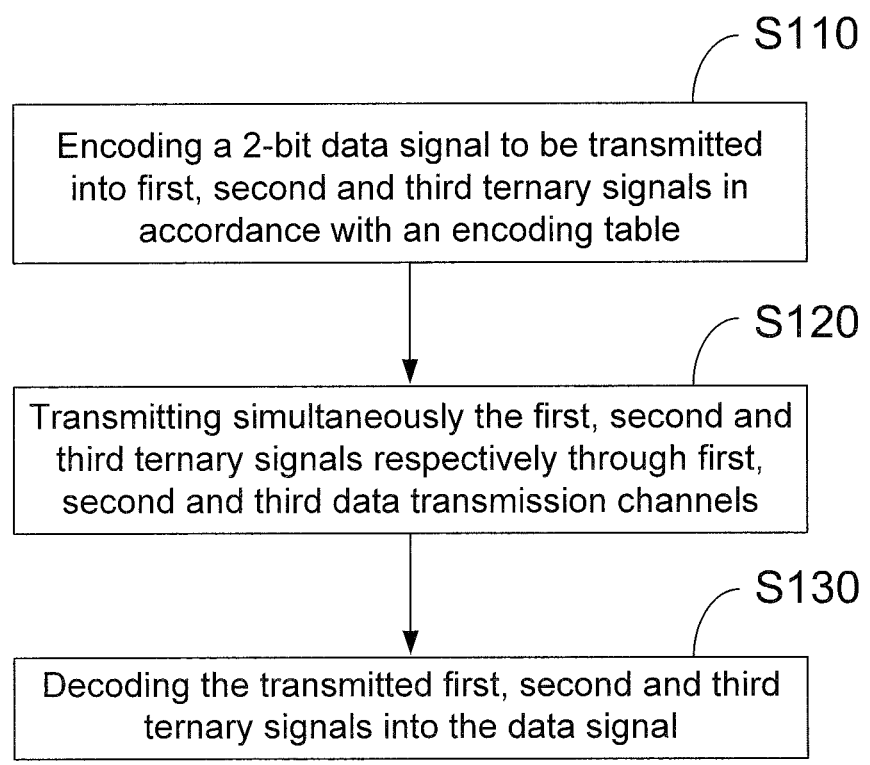
FIG. 1 shows schematically a flowchart of a 2B1T method for high speed multi-level data transmission according to one embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present invention in conjunction with the accompanying drawings in FIGS. 1-17. In accordance with the purposes of this invention, as embodied and broadly described herein, this invention, in one aspect, relates to methods and systems that utilize multiple multi-level signals to transmit a binary data signal.

In one embodiment, the method is corresponding to a 2B1T method for high speed multi-level data transmission, where a data signal with its length of two bits (2B) is transmitted in the form of three ternary signals (1T) simultaneously and respectively through three data transmission channels, thereby increasing the data transmission rate significantly. The 2B1T method is hereinafter described in detail with reference to FIGS. 1-3.

FIG. 1 shows schematically a flowchart of the 2B1T method for high speed multi-level data transmission according to one embodiment of the present invention. The 2B1T method includes encoding a data signal to be transmitted into first, second and third ternary signals in accordance with an encoding table at step 110. The data signal to be transmitted can be an analog signal or a digital signal in any format. The first, second and third ternary signals are configured such that each of the first, second and third ternary signals has three signal levels, and at the same time each of the first, second and third ternary signals has a signal level different from that of the other two of the first, second and third ternary signals. As such, the cumulative signal level of the first, second and third ternary signals is zero, and thus, there is no electromagnetic interference (EMI) during the data transmission.

According to one embodiment of the invention, the data signal needs to be converted into a stream of binary data segments. Each binary data segment has the data length of two bits comprising the first bit and the second bit. For example, each binary data segment is expressed as one of four binary permutations of the first and second bits, (00), (01), (10) and (11). For a binary data segment "01", the first bit of the binary data segment is "0" and the second bit of the binary data segment is "1". The stream of binary data segments is then mapped onto the first, second and third ternary signals in accordance with the encoding table.

The encoding (or convention, or mapping) table is defined as follows. For the 2B1T data transmission scheme, three ternary level data are provided, where each of the three ternary level data has a different level from the other two of the three ternary level data. In one embodiment, the three ternary level data comprise a positive level data (shown as 1), a zero level data (shown as 0), and a negative level data (shown as −1), and a cumulative signal level of the three ternary level data is zero. Since all three ternary level data have different signal levels, permuting the three ternary level data generates six ternary permutations, as shown by (A, B, C) in the table of FIG. 2A, which include (−1, 0, 1), (−1, 1, 0), (1, −1, 0), (1, 0, −1), (0, 1, −1) and (0, −1, 1). Each permutation is corresponding to a respective state of the three ternary level data.

Figures 2A, 2B:
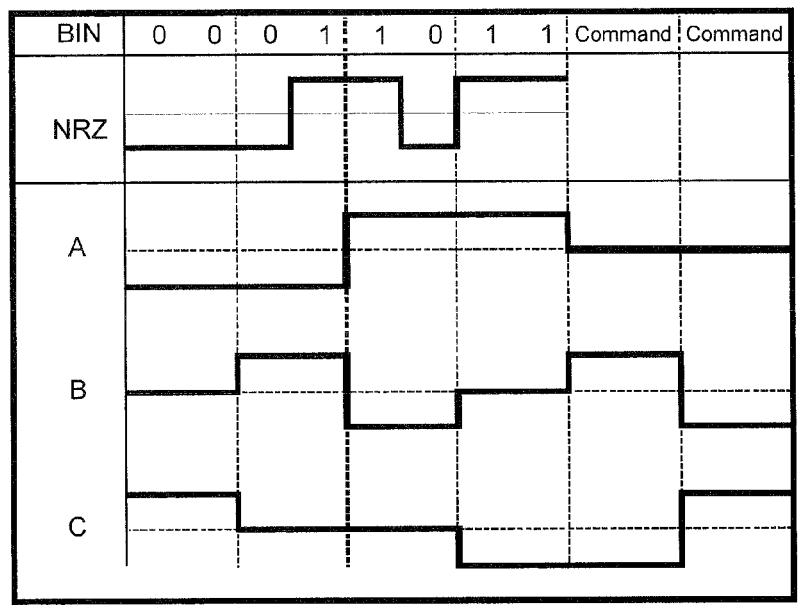
FIG. 2A shows schematically a 2B1T table of the ternary permutations of the three ternary level data according to one embodiment of the present invention.
FIG. 2B shows schematically the relationship of the binary numbers and the three ternary signals according to one embodiment of the present invention.

The permutations (A, B, C) of the three ternary level data are used for transmitting of the stream of binary data segments with the length of two bits, which are expressed in the four binary permutations, (00), (01), (10) and (11), as disclosed above. To map the four binary permutations into the six ternary permutations, four of the six ternary permutations are selected as four data permutations for transmitting the signal, such that each of the four data permutations corresponds to a binary number between 00 (decimal number of 0) and 11 (decimal number of 3), and vice versus, which define the 2B1T encoding table. As shown in FIG. 2A, in the 2B1T encoding table, decimal numbers (DEC) 0, 1, 2 and 3 are respectively expressed as binary numbers/permutations (BIN) (00), (01), (10) and (11), which in turn, correspond to four data permutations of the six ternary permutations (−1, 0, 1), (−1, 1, 0), (1, −1, 0) and (1, 0, −1), respectively. Specifically, of the four data permutations, the data permutation (−1, 0, 1) corresponds to the binary number 00 (the decimal number 0), the data permutation (−1, 1, 0) corresponds to the binary number 01 (the decimal number 1), the data permutation (1, −1, 0) corresponds to the binary number 10 (the decimal number 2), and the data permutation (1, 0, −1) corresponds to the binary number 11 (the decimal number 3). The correspondence between the data permutations and the binary numbers defines a 2B1T encoding table as shown in FIG. 2A. In one embodiment, the 2B1T encoding table is corresponding to a look-up table for data mapping.

Once the 2B1T encoding table is defined, the stream of binary data segments is mapped onto the first, second and third ternary signals A, B and C in accordance with the encoding table. In other words, each of the binary data segments is mapped or projected onto a corresponding data permutation. For example, the binary data segment "00" is encoded to obtain the corresponding data permutation (−1, 0, 1) having the third ternary signals A=−1, B=0 and C=1; the binary data segment "01" is encoded to obtain the corresponding data permutation (−1, 1, 0) having the third ternary signals A=−1, B=1 and C=0; the binary data segment "10" is encoded to obtain the corresponding data permutation (1, −1, 0) having the third ternary signals A=1, B=−1 and C=0; and the binary data segment "11" is encoded to obtain the corresponding data permutation (1, 0, −1) having the third ternary signals A=1, B=0 and C=−1.

Figures 3A, 3B:
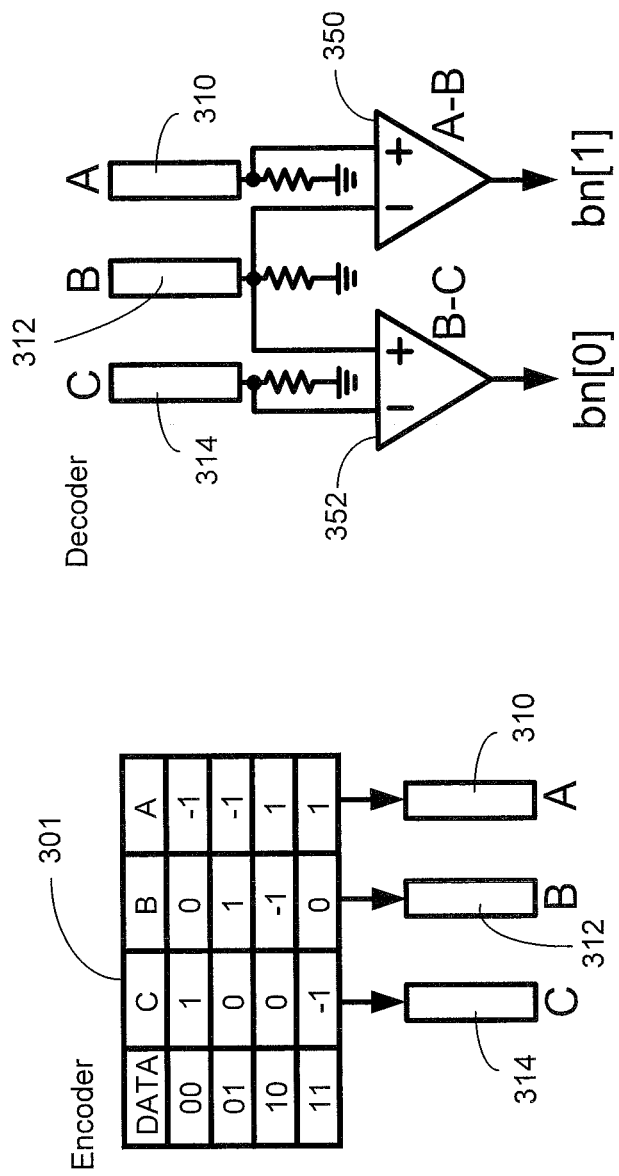
FIGS. 3A and 3B show schematically an encoder and a decoder, respectively, of a 2B1T system for high speed multi-level data transmission according to one embodiment of the present invention.

FIG. 3A shows schematically an encoder for encoding binary data segments into first, second and third ternary signals in accordance with the encoding table 301. Each of the corresponding data permutations (A, B, C) can be treated as a state of a first ternary signal A, a second ternary signal B and a third ternary signal C. For example, in the corresponding data permutation (−1, 0, 1), the first ternary signal A is −1, the second ternary signal B is 0, and the third ternary signal C is 1. In the corresponding data permutation (−1, 1, 0), the first ternary signal A is −1, the second ternary signal B is 1, and the third ternary signal C is 0. In the corresponding data permutation (1, −1, 0), the first ternary signal A is 1, the second ternary signal B is −1, and the third ternary signal C is 0. In the corresponding data permutation (1, 0, −1), the first ternary signal A is 1, the second ternary signal B is 0, and the third ternary signal C is −1. One example of the first, second and third ternary signals A, B and C and their relationship with two-bit binary data segments "00", "01", "10" and "11" are shown in FIG. 2B.

Then, in step S120, the encoded first, second and third ternary signals A, B and C are simultaneously transmitted through three data transmission channels 310, 312 and 314, respectively. The three data transmission channels 310, 312 and 314 can be conductive wires/lines, data bus, optical fibers, or wireless data transmission means.

The transmitted first, second and third ternary signals A, B and C over the data transmission channels 310, 312 and 314 are decoded into the data signal at step S130, for example, by a decoder, as shown in FIG. 3B. According to the present embodiment, no complex devices or processes are needed to decode or restore the transmitted first, second and third ternary signals A, B and C into the data signal. The decoding/restoring process of the transmitted first, second and third ternary signals A, B and C into the data signal can be achieved by comparators, such as the comparators 350 and 352 shown in FIG. 3B. In one embodiment, the relationship between a specific binary data segment and its corresponding data permutation is shown in the decoding table of FIG. 2A, where the first ternary signal A minus the second ternary signal B corresponds to the first bit of the binary data segment, and the second ternary signal B minus the third ternary signal C corresponds to the second bit of the binary data segment. The correspondence between the comparison of the two ternary signals and the bits of the binary data segment can be achieved by comparators. Specifically, if the comparison of the ternary signals generates a positive value, the corresponding bit is "1", and if the comparison of the ternary signals generates a negative value, the corresponding bit is "0". For example, in the corresponding data permutation (−1, 0, 1), the first ternary signal A minus the second ternary signal B is a negative value, which corresponds to the first bit "0" of the binary data segment "00", and the second ternary signal B minus the third ternary signal C is a negative value, which corresponds to the second bit "0" of the binary data segment "00". In the corresponding data permutation (−1, 1, 0), the first ternary signal A minus the second ternary signal B is a negative value, which corresponds to the first bit "0" of the binary data segment "01", and the second ternary signal B minus the third ternary signal C is a positive value, which corresponds to the second bit "1" of the binary data segment "01". In the corresponding data permutation (1, −1, 0), the first ternary signal A minus the second ternary signal B is a positive value, which corresponds to the first bit "1" of the binary data segment "10", and the second ternary signal B minus the third ternary signal C is a negative value, which corresponds to the second bit "0" of the binary data segment "10". In the corresponding data permutation (1, 0, −1), the first ternary signal A minus the second ternary signal B is a positive value, which corresponds to the first bit "1" of the binary data segment "11", and the second ternary signal B minus the third ternary signal C is a positive value, which corresponds to the second bit "1" of the binary data segment "11".

As discussed above, the decoding process can be achieved by the comparators, such as the comparators 350 and 352 shown in FIG. 3B. The first comparator 350 compares the first ternary signal A to the second ternary signal B to obtain the first bit bn[1] of the binary data segment, and the second comparator 352 compares the second ternary signal B to the third ternary signal C to obtain the second bit bn[0] of the binary data segment.

According to the embodiment, four of the six ternary permutations are used as the data permutations. The other two ternary permutations (0, 1, −1) and (0, −1, 1) of the three ternary signals A, B and C are used as command codes, for example, for providing clock signals.

An example of the use of the command codes is to provide clock data recovery (CDR) of high speed data transmission. Generally, CDR can be achieved with a delay-locked loop (DLL) or a phased-locked loop (PLL). When the DLL is used, a command code representing a clock signal is inserted periodically into the signal to be transmitted with a fixed period. On the other hand, when PLL is used, the command code is inserted into the signal to be transmitted when consecutive binary data segments of the same value exceed a predetermined run length period.

Figure 4A:
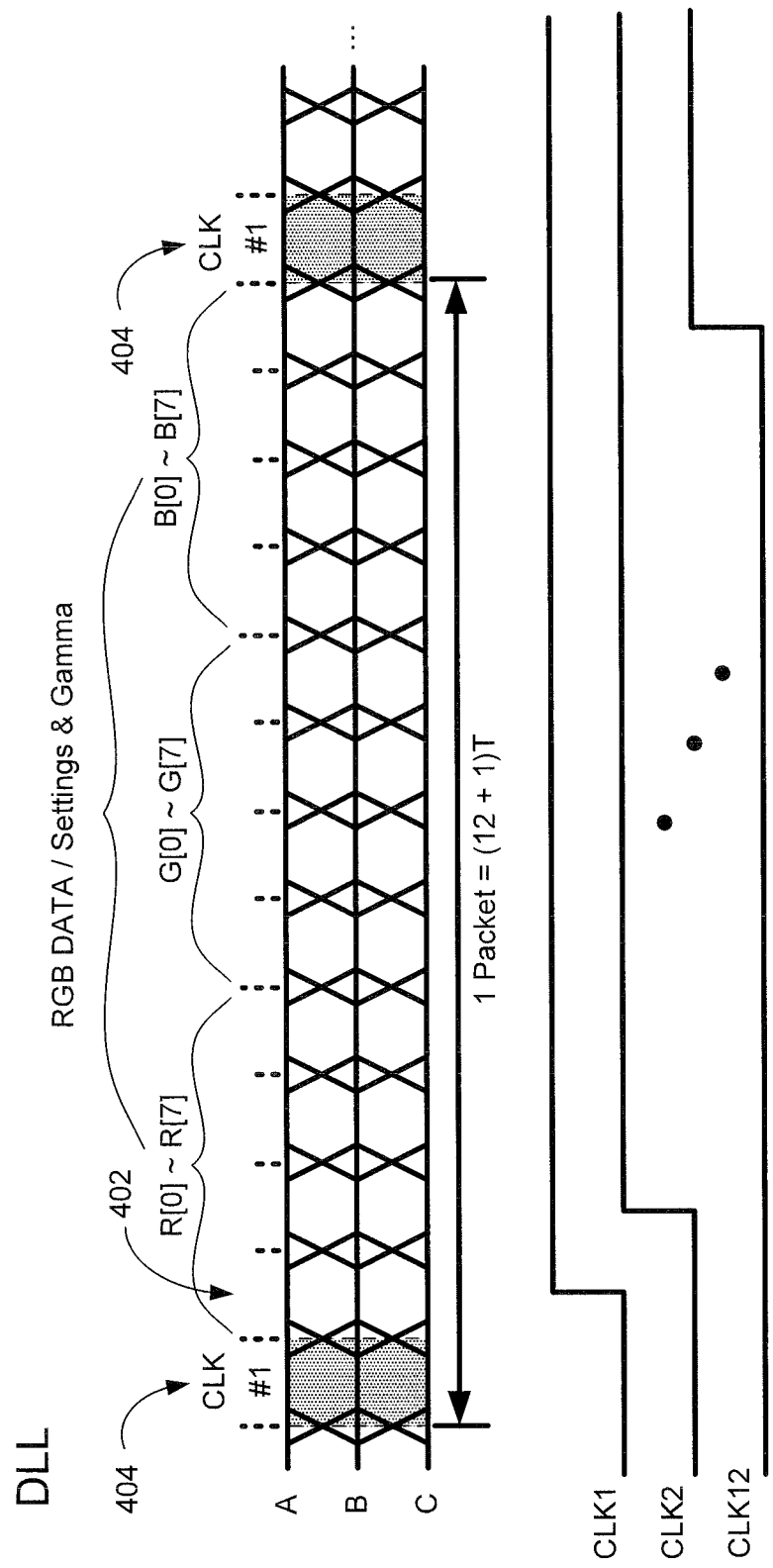
FIG. 4A shows schematically a diagram of the 2B1T DLL embedded clock signaling according to one embodiment of the present invention.

FIG. 4A shows schematically a diagram of the 2B1T DLL embedded clock signaling according to one embodiment of the present invention. To illustrate the CDR process with the DLL embedded clock signaling, the RGB data with a pixel data length of 24 bits is used as an example. As shown in FIG. 4A, the 24 bits of each RGB pixel data include 8 bits of red (R) signals R[0]-R[7], 8 bits of green (G) signals G[0]-G[7], and 8 bits of blue (B) signals B[0]-B[7], and the 24 bits are divided into 12 binary data segments 402, where each binary data segment 402 is a data permutation including the first ternary signal A, the second ternary signal B and the third ternary signal C. Further, a command code is inserted as a command segment 404 in front of the 12 binary data segments to form a packet. Each binary data segment 402 and each command segment 404 takes a period of T, and the whole packet takes (12+1) T. In this way, when the DLL receives the command segment 404, it generates 12 clock signals CLK1, CLK2, ..., and CLK12, and each clock signal corresponds to one of the binary data segment 402 in the packet. Since the command segment 404 is in the form of a command code, i.e., it includes the first ternary signal A, the second ternary signal B and the third ternary signal C, it can be recognized by the existing logical circuits, such as the comparators 350 and 352 shown in FIG. 3B. Thus, the CDR can be achieved by the DLL clock signaling.

Figure 4B:
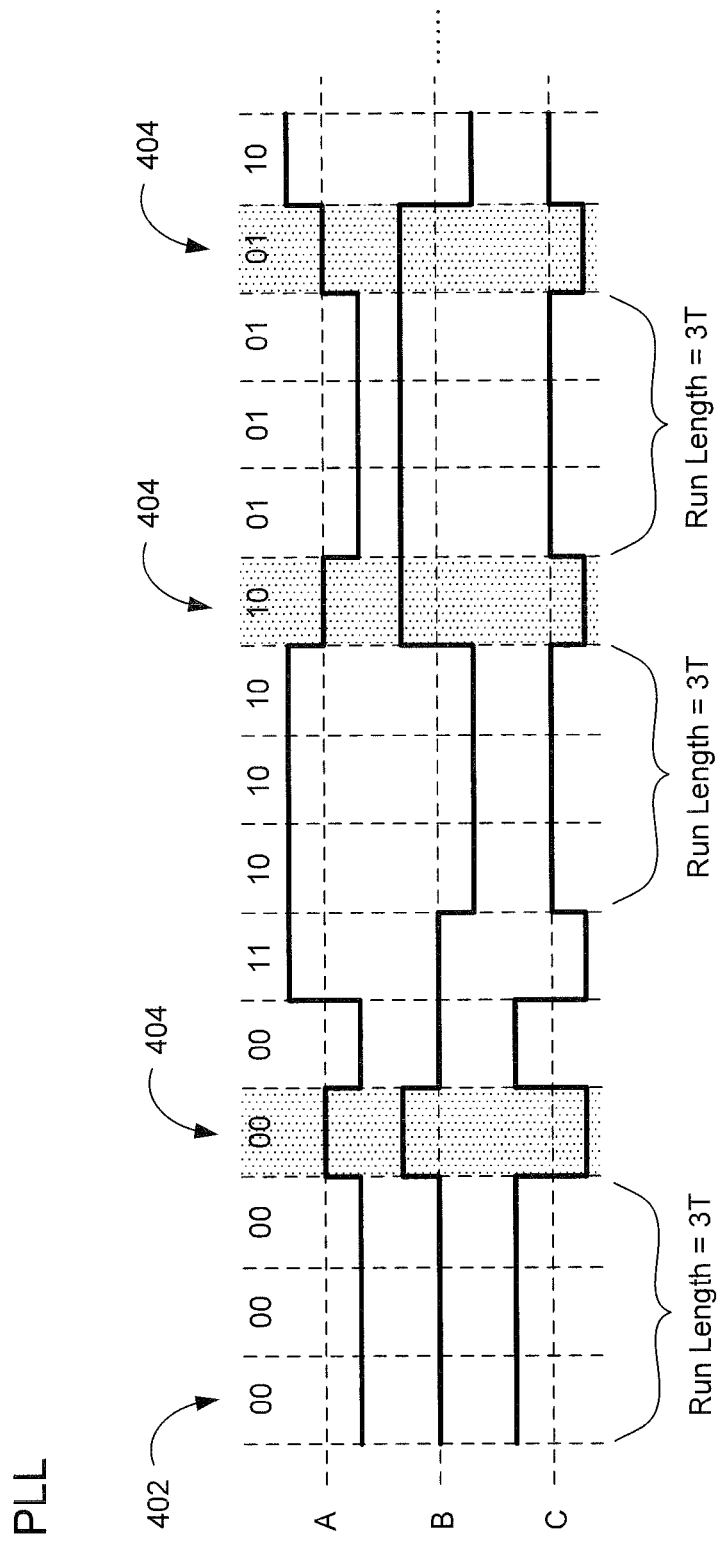
FIG. 4B shows schematically a diagram of the 2B1T PLL embedded clock signaling according to another embodiment of the present invention.

FIG. 4B shows schematically a diagram of the 2B1T PLL embedded clock signaling according to one embodiment of the present invention. As shown in FIG. 4B, each binary data segment 402 is a data permutation including the first ternary signal A, the second ternary signal B and the third ternary signal C. Further, the command code is inserted into the signal to be transmitted when consecutive binary data segments exceed a predetermined run length period. The predetermined run length period is set to be 3T (i.e., three period of binary data segments 402), and if the run length exceeds 3T (three consecutive binary data segments 402 are the same), a command code is inserted as a command segment 404. In this way, the command segments 404 will appear more often in the data stream of the PLL, and the CDR can be achieved by the PLL clock signaling.

It should be noted that, as shown in the table of FIG. 2A, when the additional permutation (0, 1, −1) is used as the command code, the first comparator 350 may compare the first ternary signal A to the second ternary signal B to obtain the first bit of "0", and the second comparator 352 compare the second ternary signal B to the third ternary signal C to obtain the second bit of "1". Thus, the command code may be falsely recognized as a data permutation which represents the binary data segment of "01". Similarly, when the additional permutation (0, −1, 1) is used as the command code, the command code may be falsely recognized as a data permutation which represents the binary data segment of "10". To avoid such confusion, additional steps may be provided to distinguish the command code from the data permutation. For example, when the first and second comparators 350 and 352 obtain bit data that indicate the binary data segment as "01" or "10", a third comparator can be provided to compare the third ternary signal C to the first ternary signal A to check if the permutation being transmitted is a data permutation or a command code. Thus, confusion between the data permutations and the command codes can be avoided.

Figure 5A:
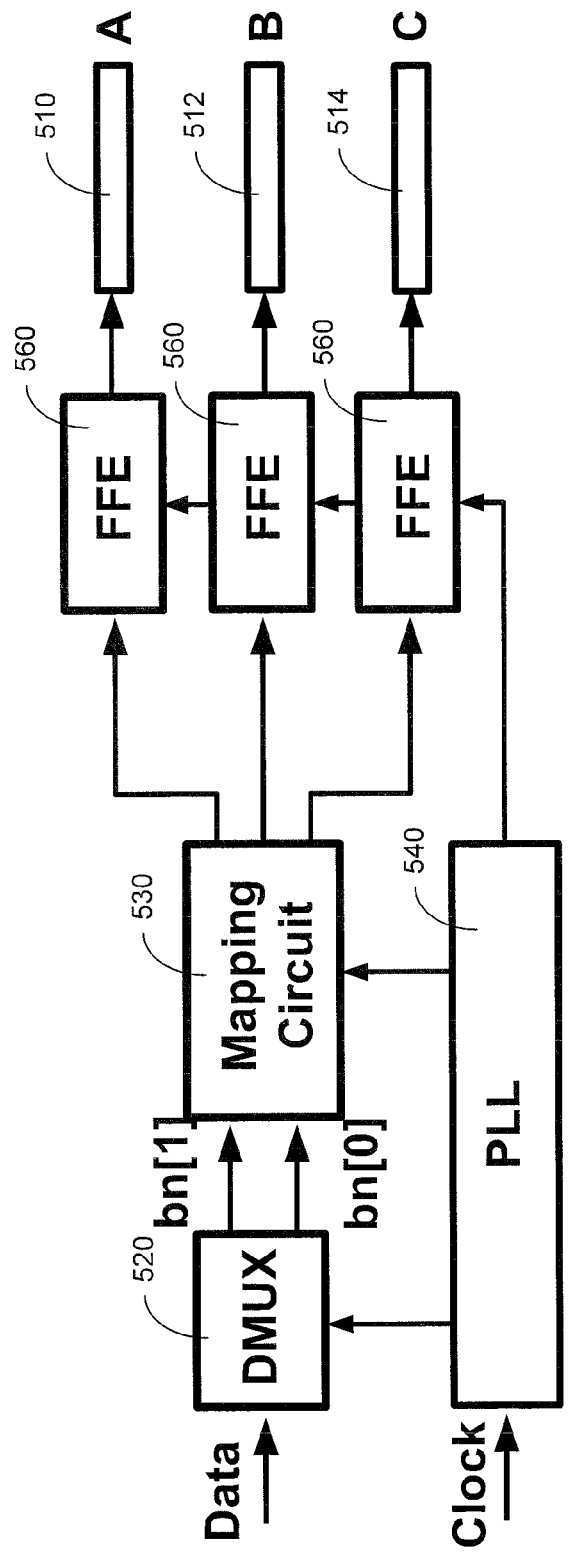
FIG. 5A shows schematically a block diagram of the transmitter of the 2B1T system for high speed multi-level data transmission according to one embodiment of the present invention.
Figure 5B:
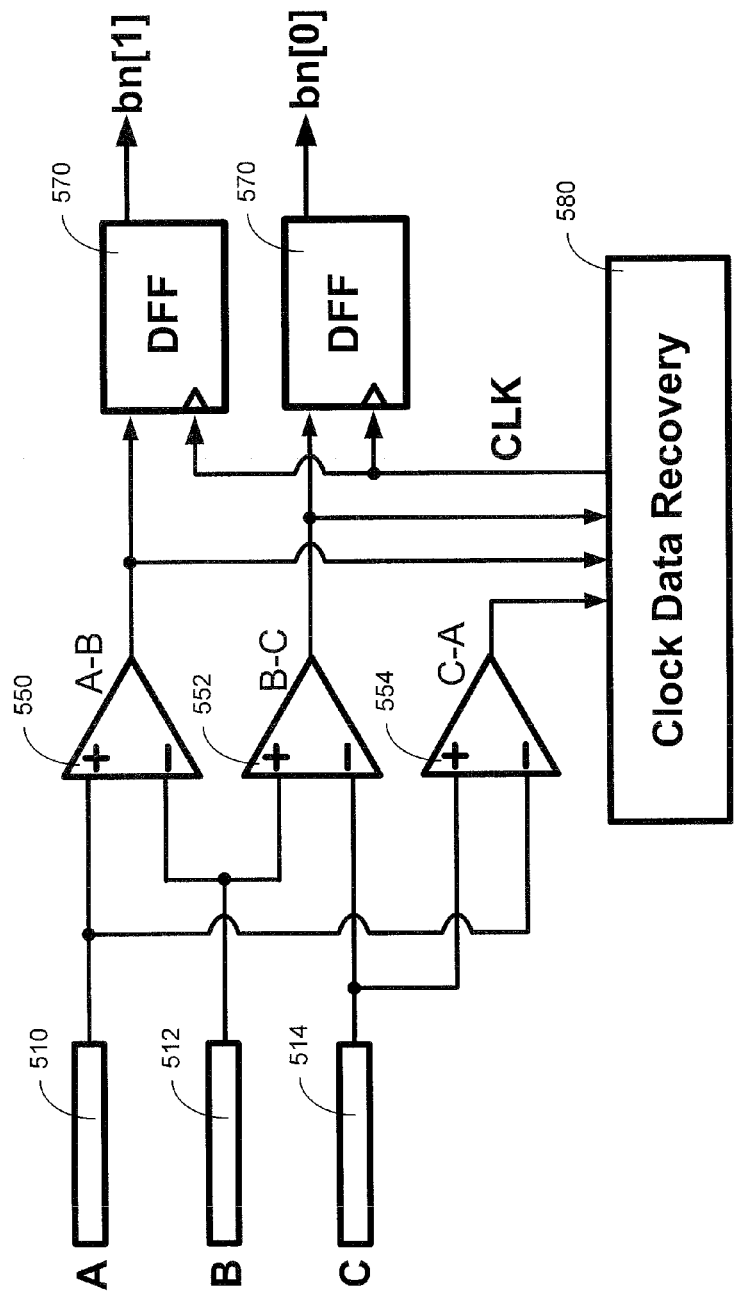
FIG. 5B shows schematically a block diagram of the receiver of the 2B1T system for high speed multi-level data transmission according to one embodiment of the present invention.

FIGS. 5A and 5B show schematically the transmitter and the receiver of the 2B1T system for high speed multi-level data transmission according to one embodiment of the present invention. As shown in FIG. 5A, the transmitter includes an encoder, a PLL circuit 540, and three feed-forward equalizers (FFEs) 560. Specifically, the encoder includes a de-multiplexer (DMUX) 520 and a mapping circuit 530 electrically coupled to the DMUX 520. Further, three data transmission channels, including a first data transmission channel 510, a second data transmission channel 512 and a third data transmission channel 514, are connected to the three FFE 560, respectively. As shown in FIG. 5B, the receiver includes a first comparator 550, a second comparator 552, a third comparator 554, two data or delay flip-flops (DFFs) 570 and a CDR circuit 580. The first comparator 550 is electrically coupled to the first and second data transmission channels 510 and 512. The second comparator 552 is electrically coupled to the second and third data transmission channels 512 and 514. The third comparator 554 is electrically coupled to the first and third data transmission channels 510 and 514.

On the transmitter side, the encoder is used to convert or map a binary data signal with a data length of two bits (which can be the binary data segment as disclosed above) to the corresponding first, second and third ternary signals A, B and C. Specifically, the DMUX 520 is used to receive a data signal and convert the data signal to a stream of the binary data signals (i.e. the binary data segments), i.e., convert each of the binary data signal to the first bit bn[1] and the second bit bn[0], and then output the first bit bn[1] and the second bit bn[0] to the mapping circuit 530. The mapping circuit 530 then converts the first bit bn[1] and the second bit bn[0] received from the DMUX 520 to the corresponding first, second and third ternary signals A, B and C.

The PLL circuit 540 is provided to for the clock control. Specifically, the PLL circuit 540 provides clock signals, such as the command code as disclosed above, for clock signaling. The three FFE 560 are provided for a feed-forward control of the first, second and third ternary signals A, B and C. The use of the PLL circuit 540 and the FFE 560 are known to the persons of ordinary skills in the art, and the description thereof is hereinafter omitted.

The first data transmission channel 510, the second data transmission channel 512 and the third data transmission channel 514 are provided to transmit the first, second and third ternary signals A, B and C, respectively, from the transmitter to the receiver.

On the receiver side, the first comparator 550 receives the first ternary signal A and the second ternary signal B and generates the first bit bn[1] of the binary data signal based on comparison between the first ternary signal A and the second ternary signal B. More specifically, if the first ternary signal A minus the second ternary signal B is a positive value, the first bit bn[1] is "1", and the first ternary signal A minus the second ternary signal B is a negative value, the first bit bn[1] is "0". Similarly, the second comparator 552 receives the second ternary signal B and the third ternary signal C and generates the second bit bn[0] of the binary data signal based on comparison between the second ternary signal B and the third ternary signal C. More specifically, if the second ternary signal B minus the third ternary signal C is a positive value, the second bit bn[0] is "1", and the second ternary signal B minus the third ternary signal C is a negative value, the second bit bn[0] is "0". Further, the third comparator 554 receives the third ternary signal C to the first ternary signal A and generates a check bit based on comparison between the third ternary signal C and the first ternary signal A to distinguish the data permutation and the command code.

The CDR circuit 580 receives the first bit bn[1] from the first comparator 550, the second bit bn[0] from the second comparator 552, and the check bit from the third comparator 554 to generate a clock signal CLK. As disclosed above, the CDR circuit 580 may include a PLL circuit or a DLL circuit. Each of the DFF 570 receives the clock signal CLK and the corresponding bit signal from its corresponding first or second comparators 550 or 552, and outputs the corresponding first bit bn[1] or second bit bn[0]. The use of the DFF 570 and the CDR circuit 580 are known to the persons of ordinary skills in the art, and the description thereof is hereinafter omitted.

Figures 5C, 5D:
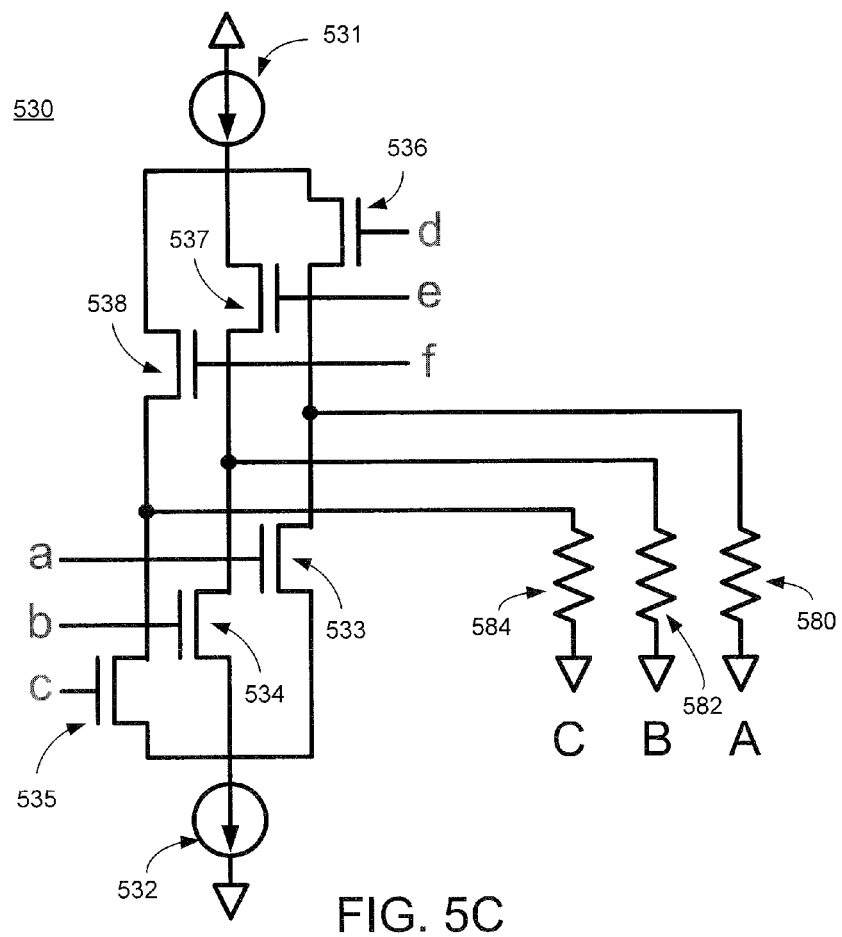
FIG. 5C shows schematically a mapping circuit of the 2B1T system for high speed multi-level data transmission according to one embodiment of the present invention.
FIG. 5D shows schematically an expanded 2B1T table of the ternary permutations corresponding to the transmitter in FIG. 5C according to one embodiment of the present invention.

It should be noted that the mapping circuit 530 can be implemented in a variety of ways, such as logical circuits. For example, FIG. 5C shows schematically a mapping circuit of the 2B1T system for high speed multi-level data transmission according to one embodiment of the present invention. In FIG. 5C, the mapping circuit 530 is formed by a plurality of logical circuit elements, includes first and second signal generator 531 and 532, six switches 533, 534, 535, 536, 537 and 538, and three resistances 580, 582 and 584.

The first signal generator 531 generates a negative signal, and the second signal generator 532 generates a positive signal. In one embodiment, the first and second signal generator 531 and 532 are current sources. As shown in FIG. 5C, the first current source 531 and the second current source 532 are connected to provide currents which flow in different directions, in which the first current source 531 provides a negative current, and the second current source 532 provides a positive current.

In one embodiment, the three resistances 580, 582 and 584 serve as the output of the mapping circuit 530. In other words, each of the three resistances 580, 582 and 584 is respectively connected to the corresponding data transmission channels 510, 512 and 514 through the FFE 560, as shown in FIG. 5A, to generate the first, second and third ternary signals, respectively.

The six switches 533, 534, 535, 536, 537 and 538 include three first switches 533, 534 and 535 and three second switches 536, 537 and 538. Each of the first switches 533, 534 and 535 is respectively connected between the first, second and third resistances 580, 582 and 584 and the first signal generator 531, and each of the second switches 536, 537 and 538 is respectively connected between the first, second and third resistances 580, 582 and 584 and the second signal generator 532. In one embodiment, the first switches 533, 534 and 535 and the second switches 536, 537 and 538 are thin-film transistors (TFTs), and are paired into three pairs of TFTs to correspond to the three resistances 580, 582 and 584, with each pair of TFTs including one first TFT connected between the first current source 531 and the corresponding data transmission channel, and one second TFT connected between the second current source 532 and the corresponding data transmission channel. For example, as shown in FIG. 5C, the first TFT 533 and the second TFT 536 are paired together to connect to the first resistance 580, the first TFT 534 and the second TFT 537 are paired together to connect to the second resistance 582, and the first TFT 535 and the second TFT 538 are paired together to connect to the resistance 584. The three first TFTS 533, 534 and 535 are respectively connected between the first current source 531 and the corresponding first, second and third resistances 580, 582 and 584, and the three second TFTS 536, 537 and 538 are respectively connected between the second current source 532 and the corresponding first, second and third resistances 580, 582 and 584.

Further, each of the six TFTS 533, 534, 535, 536, 537 and 538 has a gate, a source and a drain, and the gate of each TFT is provided with a voltage. For better illustration purpose, each of the voltages provided to the gate of the TFT is shown in the symbols a, b, c, d, e and f. In other words, the gate of the TFT 533 is provided with voltage a, the gate of the TFT 534 is provided with voltage b, the gate of the TFT 535 is provided with voltage c, the gate of the TFT 536 is provided with voltage d, the gate of the TFT 537 is provided with voltage e, and the gate of the TFT 538 is provided with voltage f. In this way, the six TFTS 533, 534, 535, 536, 537 and 538 may serve as switches, which can be switched between an ON status and an OFF status according to the voltage being provided to the gate. By controlling the voltages provided to the gates of the TFTS, the current flows provided by the first and second current sources 531 and 532 can be controlled to reach the first, second and third resistances 580, 582 and 584. The voltages a, b, c, d, e and f can be provided in the form of a voltage permutation (a, b, c, d, e, f) to correspond to the ternary permutations in an encoding table, such as the 2B1T encoding table 301 as shown in FIG. 3A. In other words, the six TFTS 533, 534, 535, 536, 537 and 538 can be switched between an ON status and an OFF status in accordance with the encoding table including the voltage permutations (a, b, c, d, e, f).

FIG. 5D shows schematically an expanded 2B1T table of the ternary permutations corresponding to the mapping circuit in FIG. 5C according to one embodiment of the present invention. As shown in FIG. 5D, the expanded 2B1T table includes the voltage permutations (a, b, c, d, e, f) to correspond to the ternary permutations (A, B, C) of the three ternary level data. As disclosed above, the three ternary level data comprise a positive level data (shown as 1), a zero level data (shown as 0), and a negative level data (shown as −1). Thus, each of the pairs of first and second TFTS will be provided with the voltages according to the expanded 2B1T table to correspond to the three ternary level data. In one embodiment, the positive level data (shown as 1) corresponds to a low voltage (shown as L) provided to the first TFT and a high voltage (shown as H) provided to the second TFT, the negative level data (shown as −1) corresponds to a high voltage (shown as H) provided to the first TFT and a low voltage (shown as L) provided to the second TFT, and the zero level data (shown as 0) corresponds to both low voltages (shown as L) provided to the first and second TFTS. Thus, according to the expanded 2B1T table in FIG. 5D, the data permutation (−1, 0, 1) corresponds to the voltage permutation (H, L, L, L, L H), the data permutation (−1, 1, 0) corresponds to the voltage permutation (H, L, L, L, H, L), the data permutation (1, −1, 0) corresponds to the voltage permutation (L, H, L, H, L, L), and the data permutation (1, 0, −1) corresponds to the voltage permutation (L, L, H, H, L, L). The additional permutation (0, 1, −1) corresponds to the voltage permutation (L, L, H, L, H, L), and the additional permutation (0, −1, 1) corresponds to the voltage permutation (L, H, L, L, L, H).

The correspondence between the ternary permutations and the voltage permutations can be further described in detail with reference to FIGS. 5C and 5D. For example, according to the expanded 2B1T table in FIG. 5D, the data permutation (−1, 0, 1) corresponds to the voltage permutation (H, L, L, L, L H). Thus, in the mapping circuit 530 as shown in FIG. 5C, the first TFT 533 is provided with a high voltage (a=H) to switch to the ON status to allow the negative current provided by the first current source 531 to flow to the resistance 580 to generate a negative level signal as the first ternary signal A=−1, and the second TFT 536 is provided with a low voltage (d=L) to switch to the OFF status to block the positive current provided by the second current source 532; both the first TFT 534 and the second TFT 537 are provided with low voltages (b=L, e=L) to switch to the OFF status to block both the currents provided by the first and second current sources 531 and 532.such that the resistance 582 generates a zero level signal (i.e., no signal due to both current flows being blocked) as the second ternary signal B=0; the first TFT 535 is provided with a low voltage (c=L) to switch to the OFF status to block the negative current provided by the first current source 531 and the second TFT 538 is provided with a high voltage (f=H) to switch to the ON status to allow the positive current provided by the second current source 532 to flow to the resistance 584 to generate a positive level signal as the third ternary signal C=1. Similarly, other ternary permutations can be obtained in a similar way from the voltage permutations according to the expanded 2B1T table in FIG. 5D by the operation of the mapping circuit in FIG. 5C.

It should be noted that the mapping circuit in FIG. 5C can be realized with different formations of logical circuit elements or any other implementation. Further, the mapping circuit in FIG. 5C and the expanded 2B1T encoding table in FIG. 5D merely describe one embodiment of the present invention, and is not intended to limit the formation of the mapping circuit or the transmitter.

In one embodiment, the method for high speed multi-level data transmission is a 4B1Q method, where a signal with its length of four bits (4B) can be transmitted in the form of permutations of four quaternary level data (1Q) simultaneously. The 4B1Q method will be hereinafter described in detail with reference to FIGS. 6-8.

Figure 6:
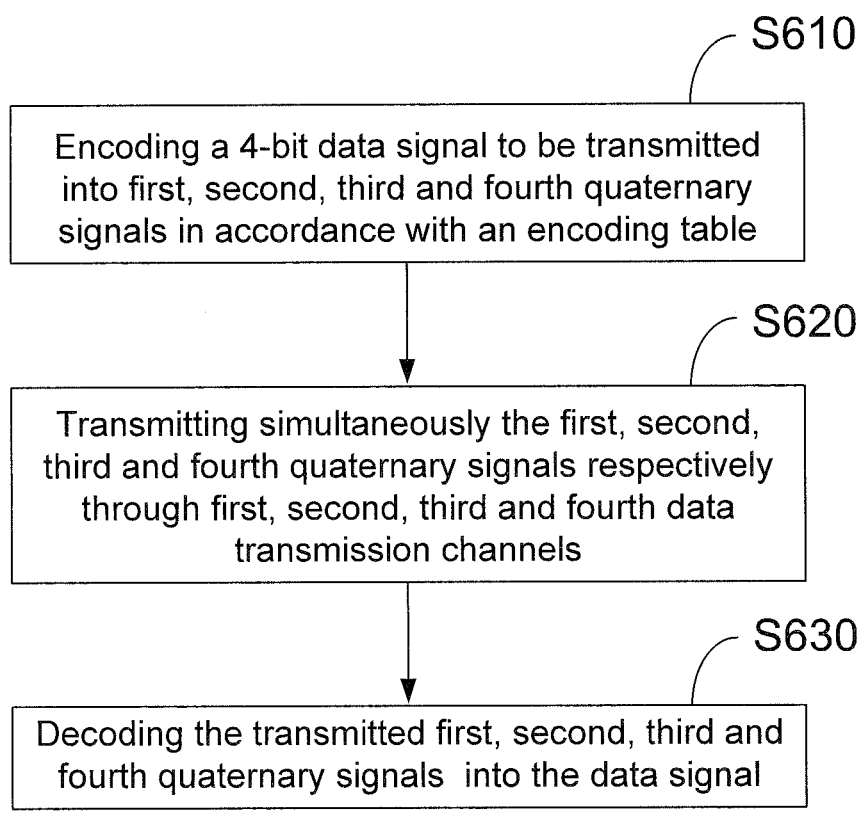
FIG. 6 shows schematically a flowchart of a 4B1Q method for high speed multi-level data transmission according to one embodiment of the present invention.

Referring now to FIG. 6, a flowchart of a 4B1Q method for high speed multi-level data transmission is shown according to one embodiment of the present invention, where a data signal with its length of four bits (4B) is transmitted in the form of four quaternary signals (1Q) simultaneously and respectively through four data transmission channels. As shown in FIG. 6, the 4B1Q method includes encoding a data signal to be transmitted into first, second, third and fourth quaternary signals in accordance with an encoding table at step 610.

The first, second, third and fourth quaternary signals are configured such that each of the first, second, third and fourth quaternary signals has three signal levels, and at the same time each of the first, second, third and fourth quaternary signals has a signal level different from that of the other three of the first, second, third and fourth quaternary signals. As such, the cumulative signal level of the first, second, third and fourth quaternary signals is zero, and thus, there is no EMI occurred during the data transmission.

According to one embodiment of the invention, the data signal is first converted into a stream of binary data segments with each binary data segment having the data length of four bits, i.e., a first bit, a second bit, a third bit and a fourth bit. For example, each binary data segment is expressed as one of sixteen (16) binary permutations of the first bit, the second bit, the third bit and the fourth bit, (0000), (0001), (0010), . . . , and (1111). For a binary data segment "0101", for example, the first bit of the binary data segment is "0", the second bit of the binary data segment is "1", the third bit of the binary data segment is "0", and the fourth bit of the binary data segment is "1". The stream of binary data segments is then mapped onto the first, second, third and fourth quaternary signals in accordance with the encoding table, which is defined as below.

For the 4B1Q data transmission scheme, four quaternary level data are provided, and each of the four quaternary level data has a different level from the other three of the four quaternary level data. As shown in FIG. 7, the four quaternary level data comprise a +3 level data, a +1 level data, a −1 level data, and a −3 level data, with the signal level between each of the quaternary level data being the same level of 2, and thus, a cumulative signal level of the four quaternary level data is zero. Other values can also be assigned as data levels for practice of the invention. Since all four quaternary level data have different signal levels, permuting of the four quaternary level data generates twenty-four (24) quaternary permutations, as shown by (A, B, C, D) in the table of FIG. 7.

As disclosed above, the permutations (A, B, C, D) of the four quaternary level data are used for encoding the signal with the length of four bits. Of the twenty-four (24) quaternary permutations, sixteen (16) permutations of the twenty-four (24) quaternary permutations are used for encoding the 4-bit signal, and each of the 16 data permutations corresponds to a binary number between 0000 (decimal number of 0) and 1111 (decimal number of 15). The other eight (8) permutations of the twenty-four (24) quaternary permutations are used as control codes. As shown in the table of FIG. 7, the first 16 quaternary permutations are used for data encoding, while the other 8 quaternary permutations are used as control codes. For example, the binary numbers (BIN) from "0000" to "1111" correspond to decimal numbers (DEC) from "0" to "15", respectively. Each of the 16 data permutations corresponds to a binary number between 0000 (the decimal number 0) and 1111 (the decimal number 15). The correspondence between the data permutations and the binary numbers defines a 4B1Q encoding table as shown in FIG. 7.

Once the 4B1Q encoding table is defined, the stream of binary data segments is mapped onto the first, second, third and fourth quaternary signals A, B, C and D in accordance with the encoding table, as shown in FIG. 7. According the 4B1Q encoding table, for example, a binary data segment "0111" is encoded to the permutation (1, 3, −1, −3) having the first, second, third and fourth quaternary signals A=1, B=3, C=−1 and D=−3. FIG. 8A shows schematically an encoder of a 4B1Q system for high speed multi-level data transmission according to one embodiment of the present invention. Each of the corresponding data permutations (A, B, C, D) can be treated as a corresponding state of the first quaternary signal A, the second quaternary signal B, the third quaternary signal C and the fourth quaternary signal D. For example, in the corresponding data permutation (1, 3, −1, −3), the first quaternary signal A is 1, the second quaternary signal B is 3, the third quaternary signal C is −1, and the fourth quaternary signal D is −3.

Then, in step S620, the encoded first, second, third and fourth quaternary signals A, B, C and D are simultaneously transmitted through four data transmission channels 810, 812, 814 and 816, respectively. Similarly, the four data transmission channels 810, 812, 814 and 816 can be conductive wires/lines, data bus, optical fibers, or wireless data transmission means.

Figure 8B:
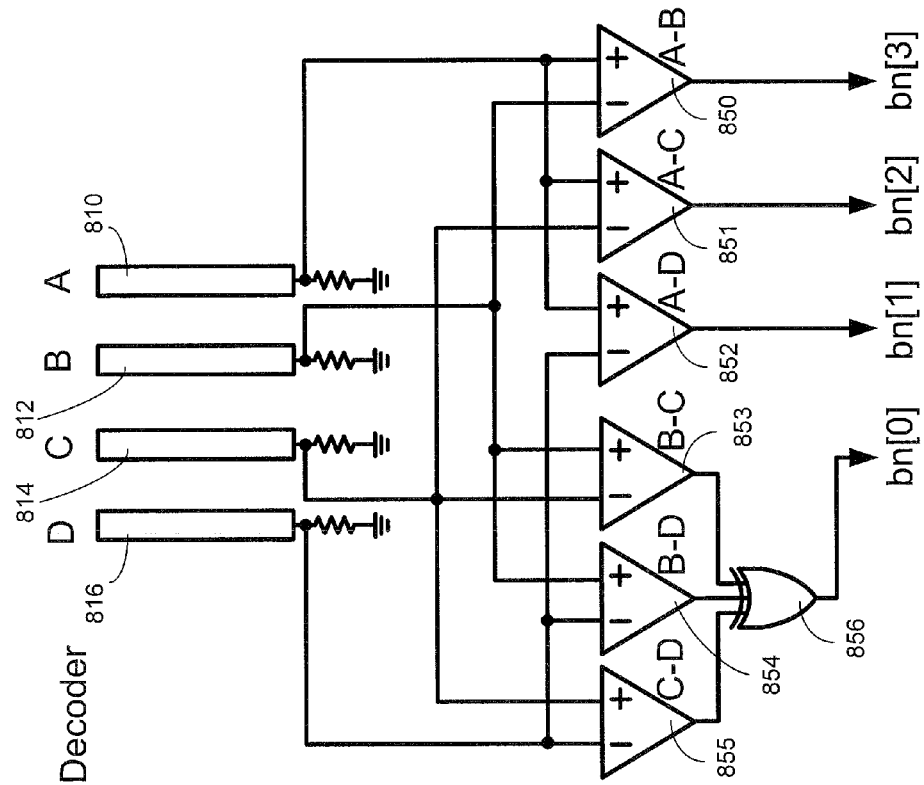
FIGS. 8A and 8B show schematically an encoder and a decoder, respectively, of a 4B1Q system for high speed multi-level data transmission according to one embodiment of the present invention.
Figure 8A:
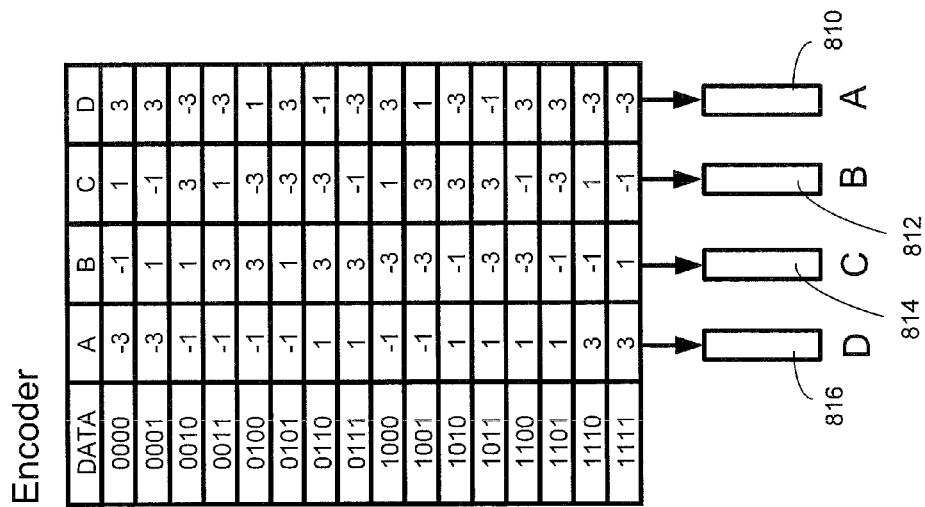

The transmitted first, second, third and fourth quaternary signals A, B, C and D over the four data transmission channels 810, 812, 814 and 816 are decoded into the data signal at step S630, for example, by a decoder, as shown in FIG. 8B. According to the present embodiment, the decoding/restoring process of the transmitted first, second, third and fourth quaternary signals A, B, C and D into the data signal can be achieved by comparisons of these transmitted quaternary signals A, B, C and D.

In one embodiment, the relationship between a specific binary data segment and its corresponding data permutation (i.e., the transmitted four quaternary signals A, B, C and D) is shown in the decoding table of FIG. 7, where the first quaternary signal A minus the second quaternary signal B corresponds to the first bit of the binary data segment, the first quaternary signal A minus the third quaternary signal C corresponds to the second bit of the binary data segment, the first quaternary signal A minus the fourth quaternary signal D corresponds to the third bit of the binary data segment, the second quaternary signal B minus the third quaternary signal C corresponds to a first intermediate bit, the second quaternary signal B minus the fourth quaternary signal D corresponds to a second intermediate bit, the third quaternary signal C minus the fourth quaternary signal D corresponds to a third intermediate bit, and an XOR operation to the first, second and third intermediate bits results in the fourth bit of the binary data segment. The correspondence between the comparison of the quaternary signals and the bits of the binary data segment can be achieved by comparators. Specifically, if the comparison of the quaternary signals generates a positive value, the corresponding bit is "1", and if the comparison of the quaternary signals generates a negative value, the corresponding bit is "0". For example, in the corresponding data permutation (1, 3, −1, −3), the first quaternary signal A minus the second quaternary signal B is a negative value, which corresponds to the first bit "0" of the binary data segment "0111", the first quaternary signal A minus the third quaternary signal C is a positive value, which corresponds to the second bit "1" of the binary data segment "0111", the first quaternary signal A minus the fourth quaternary signal D is a positive value, which corresponds to the third bit "1" of the binary data segment "0111", the second quaternary signal B minus the third quaternary signal C is a positive value, which corresponds to a first intermediate bit "1", the second quaternary signal B minus the fourth quaternary signal D is a positive value, which corresponds to a second intermediate bit "1", the third quaternary signal C minus the fourth quaternary signal D is also a positive value, which corresponds to a third intermediate bit "1"; and an XOR operation to first, second and third intermediate bits is "1", which corresponds to the fourth bit "1" of the binary data segment "0111".

In one embodiment, the decoding process can be achieved by comparators and an XOR gate, such as the comparators 850, 851, 852, 853, 854 and 855 and the XOR gate 856, as shown in FIG. 8B. The first comparator 850 compares the first quaternary signal A to the second quaternary signal B to obtain the first bit bn[3] of the binary data segment. The second comparator 851 compares the first quaternary signal A to the third quaternary signal C to obtain the second bit bn[2] of the binary data segment. The third comparator 852 compares the first quaternary signal A to the fourth quaternary signal D to obtain the third bit bn[1] of the binary data segment. The fourth comparator 853 compares the second quaternary signal B to the third quaternary signal C to obtain the first intermediate bit. The fifth comparator 854 compares the second quaternary signal B to the fourth quaternary signal D to obtain the second intermediate bit. The sixth comparator 855 compares the third quaternary signal C to the fourth quaternary signal D to obtain the third intermediate bit. The XOR gate 856 performs the XOR operation to the first, second and third intermediate bits to obtain the fourth bit bn[0] of the binary data segment.

According to the invention, only sixteen permutations of the twenty-four quaternary permutations (A, B, C, D) are used as the data permutations, while the other eight quaternary permutations are used as control codes.

An example of the use of the command codes is to provide a CDR of high speed data transmission. As disclosed above, the CDR can be achieved with DLL or PLL.

FIG. 9A shows schematically a diagram of the 4B1Q DLL embedded clock signaling according to one embodiment of the present invention. Similar to the DLL clock signaling in FIG. 4A, each of the RGB data with a pixel data length of 8 bits is used as an example. As shown in FIG. 9A, each binary data segment 902 is a data permutation including the first quaternary signal A, the second quaternary signal B, the third quaternary signal C and the fourth quaternary signal D. A command code is inserted as a command segment 904 in front of the 12 binary data segments to form a packet. Each binary data segment 902 and each command segment 904 takes a period of T, and the whole packet takes (12+1) T. In this example, when the DLL receives the command segment 904, it generates 12 clock signals CLK1, CLK2, . . . , and CLK12. Each clock signal corresponds to one of the binary data segments 902 in the packet. Since the command segment 904 is in the form of a command code, i.e., it includes the first quaternary signal A, the second quaternary signal B, the third quaternary signal C and the fourth quaternary signal D, it can be recognized by the existing logical circuits, such as the comparators 850-855 and the XOR gate 856, as shown in FIG. 8B. Thus, the CDR can be achieved by the DLL clock signaling.

Figure 9B:
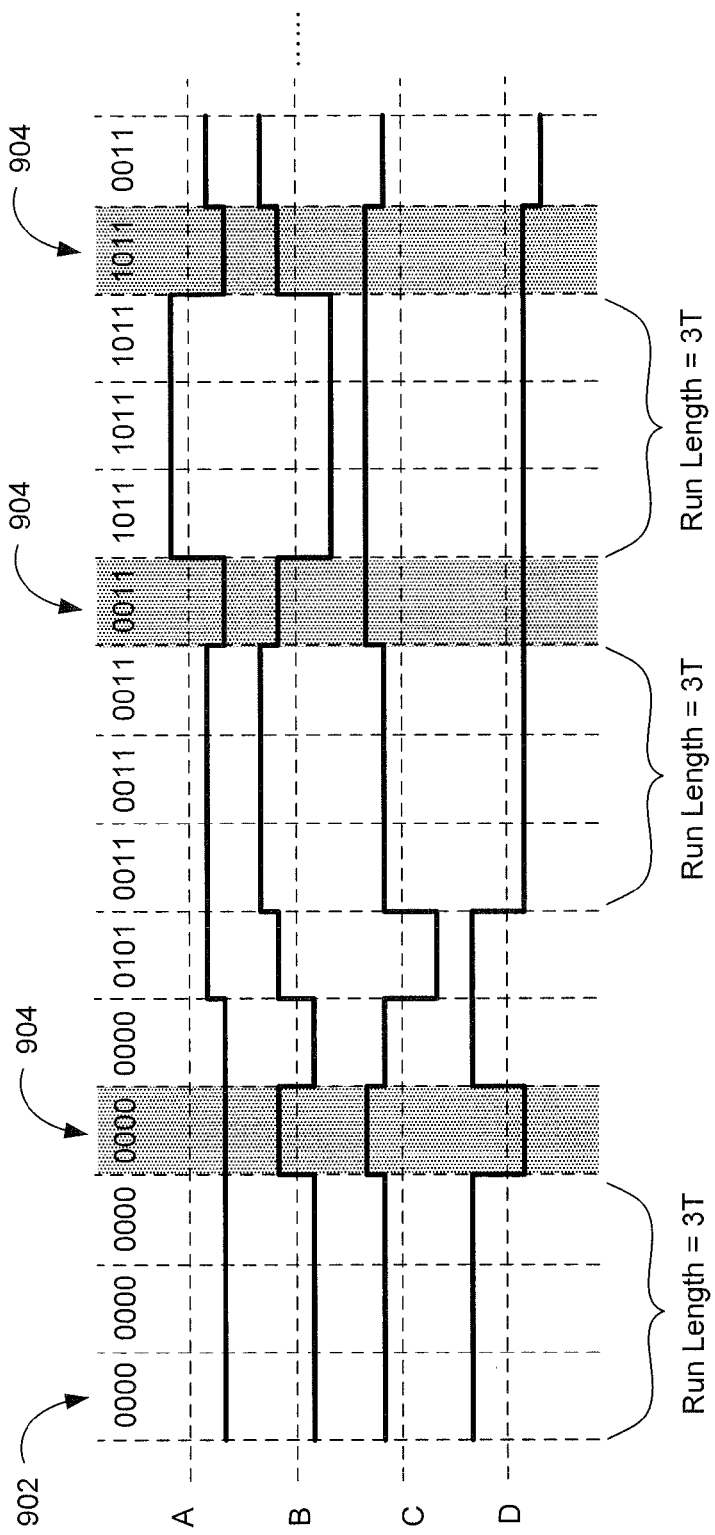
FIG. 9B shows schematically a diagram of the 4B1Q PLL embedded clock signaling according to another embodiment of the present invention.

FIG. 9B shows schematically a diagram of the 4B1Q PLL embedded clock signaling according to one embodiment of the present invention. Similar to the PLL clock signaling in FIG. 4B, as shown in FIG. 4B, each binary data segment 902 is a data permutation including the first quaternary signal A, the second quaternary signal B, the third quaternary signal C and the fourth quaternary signal D. The command code is inserted into the signal to be transmitted when consecutive binary data segments exceed a predetermined run length period. The predetermined run length period is set to be 3T (i.e., three period of binary data segments 902), and if the run length exceeds 3T (three consecutive binary data segments 902 are the same), a command code is inserted as a command segment 904. In this way, the command segments 904 will appear more often in the data stream of the PLL, and the CDR can be achieved by the PLL clock signaling.

In one embodiment, as shown in the table of FIG. 7, when any of the other eight permutations are used as the command code, the result of the first, second and third comparators 850, 851, 852 and the XOR gate 856 may be the same as the result obtained from one of the data permutations. For example, the command code (−3, 1, 3, −1), which is shown as "Command #1", would generate the same result as the date permutation (−3, −1, 1, 3), which corresponds to the binary data segment of "0000". Thus, each of the command code may be falsely recognized as a data permutation which represents a corresponding binary data segment. To avoid such confusion, additional steps may be provided to distinguish the command code from the data permutation. For example, the first, second and third intermediate bits obtained by the fourth, fifth and sixth comparators 853, 854 and 855 may be used to check if the permutation being transmitted is a data permutation or a command code. Thus, confusion between the data permutations and the command codes can be avoided.

Figure 10A:
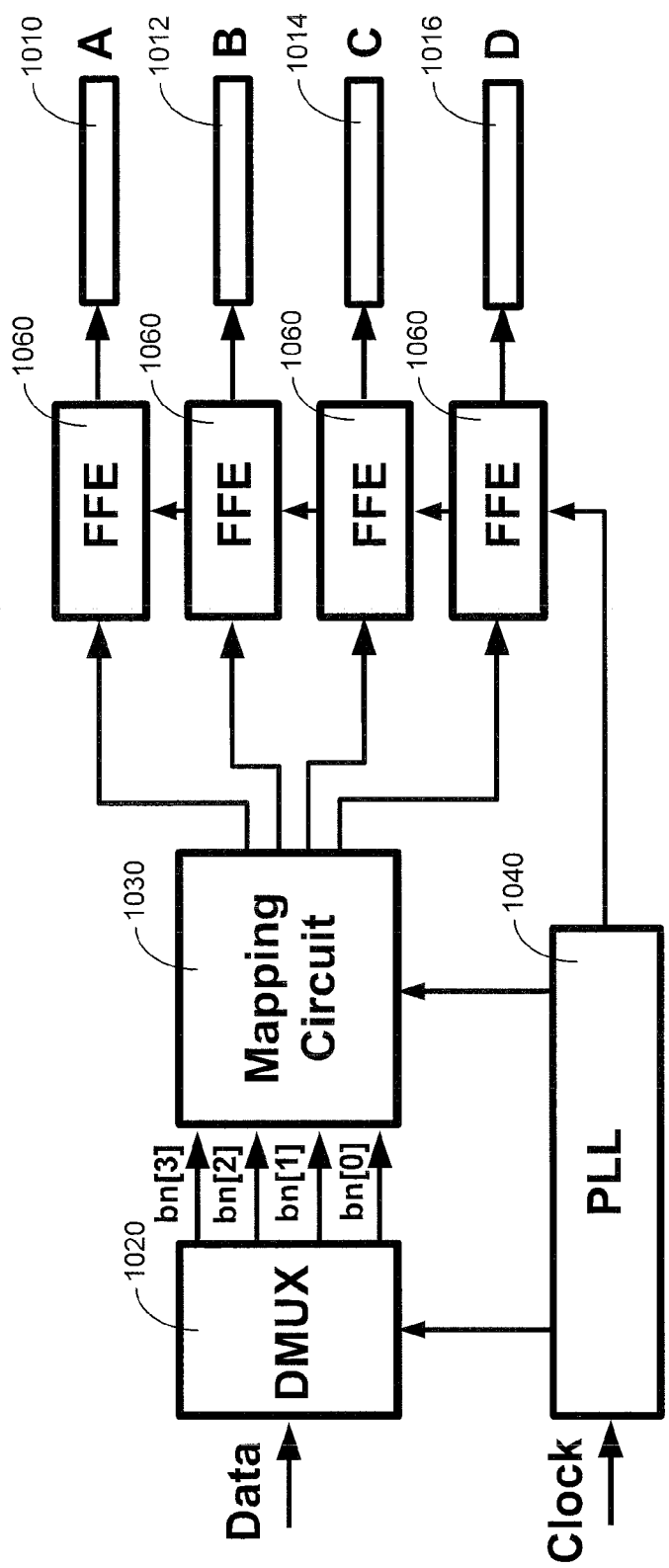
FIG. 10A shows schematically a block diagram of the transmitter of the 4B1Q system for high speed multi-level data transmission according to one embodiment of the present invention.
Figure 10B:
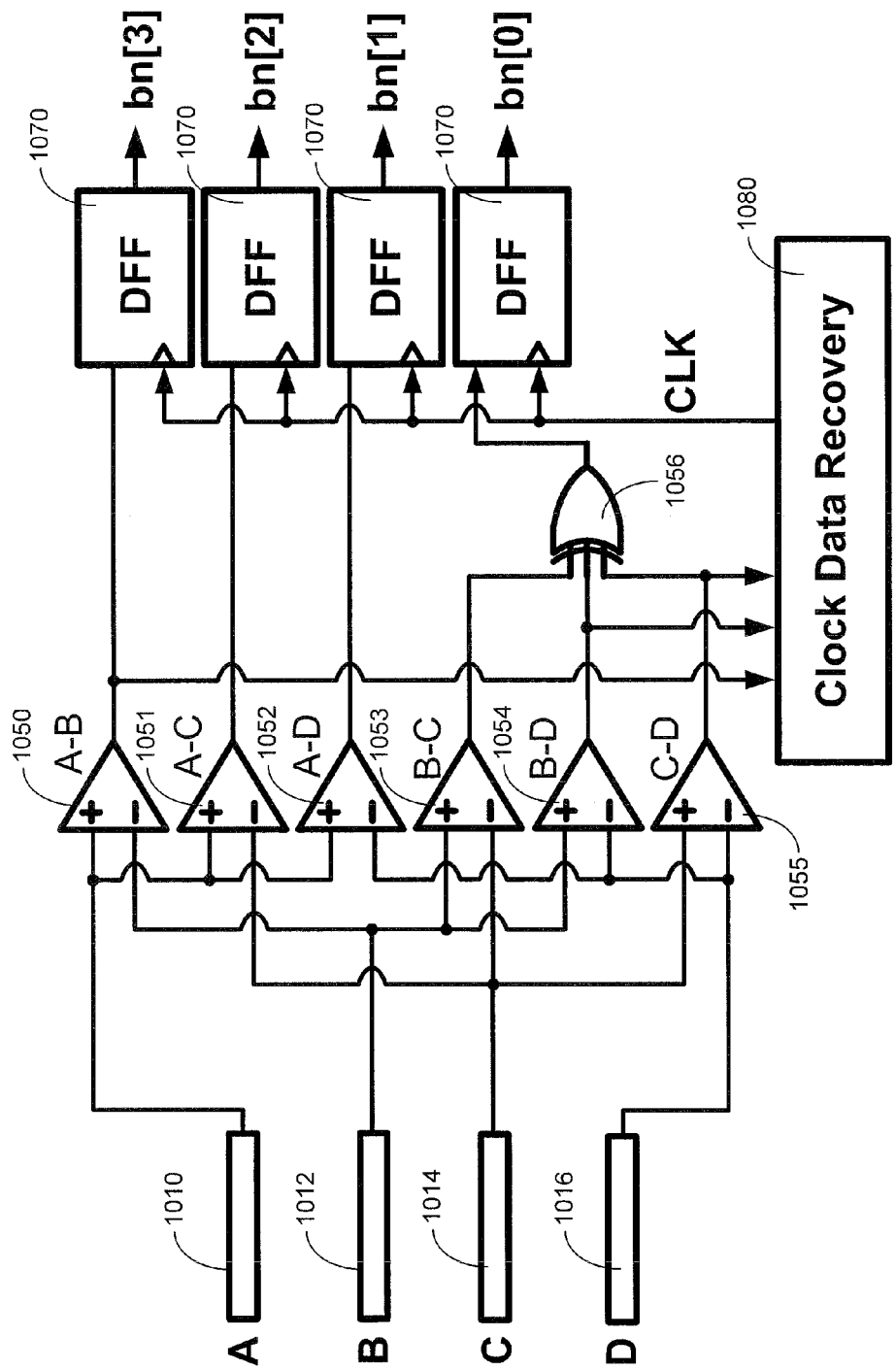
FIG. 10B shows schematically a block diagram of the receiver of the 4B1Q system for high speed multi-level data transmission according to one embodiment of the present invention.

Referring to FIGS. 10A and 10B, a transmitter and a receiver of the 4B1Q system for high speed multi-level data transmission are respectively shown according to one embodiment of the present invention. As shown in FIG. 10A, the transmitter includes an encoder, a PLL circuit 1040, and four FFE 1060. Specifically, the encoder includes a DMUX 1020 and a mapping circuit 1030 electrically coupled to the DMUX 1020. Further, four signals lines including a first data transmission channel 1010, a second data transmission channel 1012, a third data transmission channel 1014 and a fourth data transmission channel 1016, are connected to the four FFEs 1060, respectively. As shown in FIG. 10B, the receiver includes a first comparator 1050, a second comparator 1051, a third comparator 1052, a fourth comparator 1053, a fifth comparator 1054, a sixth comparator 1055, an XOR gate 1056, four DFF 1070 and a CDR circuit 1080. The first comparator 1050 is electrically coupled to the first and second data transmission channels 1010 and 1012. The second comparator 1051 is electrically coupled to the first and third data transmission channels 1010 and 1014. The third comparator 1052 is electrically coupled to the first and fourth data transmission channels 1010 and 1016. The fourth comparator 1053 is electrically coupled to the second and third data transmission channels 1012 and 1014. The fifth comparator 1054 is electrically coupled to the second and fourth data transmission channels 1012 and 1016. The sixth comparator 1055 is electrically coupled to the third and fourth data transmission channels 1014 and 1016. The XOR gate 1056 is electrically coupled to the fourth, fifth and sixth comparators 1053, 1054 and 1055.

On the transmitter side, the encoder is used to convert a data signal into a stream of binary data segments with a data length of four bits, which is encoded into corresponding first, second, third and fourth quaternary signals A, B, C and D. Specifically, the DMUX 1020 is used to receive a data stream and convert the data stream to a plurality of the binary data segments, i.e., convert each of the binary data segments to the first bit bn[3], the second bit bn[2], the third bit bn[1] and the fourth bit bn[0], and then output the first bit bn[3], the second bit bn[2], the third bit bn[1] and the fourth bit bn[0] to the mapping circuit 1030. The mapping circuit 1030 then converts or maps the first bit bn[3], the second bit bn[2], the third bit bn[1] and the fourth bit bn[0] received to the corresponding first, second, third and fourth quaternary signals A, B, C and D in accordance with the encoding table as shown in FIG. 7.

In one embodiment, the PLL circuit 1040 is provided to for the clock control. Specifically, the PLL circuit 1040 provides clock signals, such as the command code as disclosed above, for clock signaling. The four FFEs 1060 are provided for feed-forward control of the first, second, third and fourth quaternary signals A, B, C and D. The use of the PLL circuit 1040 and the FFEs 1060 are known to the persons of ordinary skills in the art, and the description thereof is hereinafter omitted.

The first data transmission channel 1010, the second data transmission channel 1012, the third data transmission channel 1014 and the fourth data transmission channel 1016 are provided to transmit the first, second, third and fourth quaternary signals A, B, C and D respectively from the transmitter to the receiver.

On the receiver side, the first comparator 1050 receives the first quaternary signal A and the second ternary signal B and generates the first bit bn[3] of the binary data signal based on comparison between the first quaternary signal A and the second quaternary signal B. More specifically, if the first quaternary signal A minus the second quaternary signal B is a positive value, the first bit bn[3] is "1", and the first quaternary signal A minus the second quaternary signal B is a negative value, the first bit bn[3] is "0". Similarly, the second comparator 1051 receives the first quaternary signal A and the third quaternary signal C and generates the second bit bn[2] of the binary data signal based on comparison between the first quaternary signal A and the third quaternary signal C. The third comparator 1052 receives the first quaternary signal A and the fourth quaternary signal D and generates the third bit bn[1] of the binary data signal based on comparison between the first quaternary signal A and the fourth quaternary signal D. The fourth comparator 1053 receives the second quaternary signal B and the third quaternary signal C and generates the first intermediate bit based on comparison between the second quaternary signal B and the third quaternary signal C. The fifth comparator 1054 receives the second quaternary signal B and the fourth quaternary signal D and generates the second intermediate bit based on comparison between the second quaternary signal B and the fourth quaternary signal D. The sixth comparator 1055 receives the third quaternary signal C and the fourth quaternary signal D and generates the third intermediate bit based on comparison between the third quaternary signal C and the fourth quaternary signal D. Further, the XOR gate 1056 receives the first, second and third intermediate bits and generates the fourth bit bn[0] of the binary data signal based on a result of the XOR operation to the first, second and third intermediate bits.

The CDR circuit 1080 receives the first bit bn[3] from the first comparator 1050, the second intermediate bit from the fifth comparator 1054, and the third intermediate bit from the sixth comparator 1055 to generate a clock signal CLK. As shown in FIG. 7, the first bit, the second intermediate bit and the third intermediate bit are enough to distinguish the command codes from the data permutations. However, the circuits can be redesigned that the CDR circuit 1080 receives any combination of the first, second and third bits and the first, second and third intermediate bits that are capable of distinguishing the command codes from the data permutations. As disclosed above, the CDR circuit 1080 can be a PLL circuit or a DLL circuit. Each of the DFFs 1070 receives the clock signal CLK and the corresponding bit signal from its corresponding comparators 1050, 1051 and 1052 or the XOR gate 1056, and outputs the corresponding first bit bn[3], second bit bn[2], third bit bn[1] or fourth bit bn[0]. The use of the DFFs 1070 and the CDR circuit 1080 are known to the persons of ordinary skills in the art, and the description thereof is hereinafter omitted.

As disclosed above, for the 2B1T and 4B1Q methods and systems, additional CDR circuits are provided to control the clock signals. In some embodiments, however, the clock signaling can be achieved by the permutations without using additional CDR circuits, thus simplifying the circuitry design of the receiver of the system.

Figure 11:
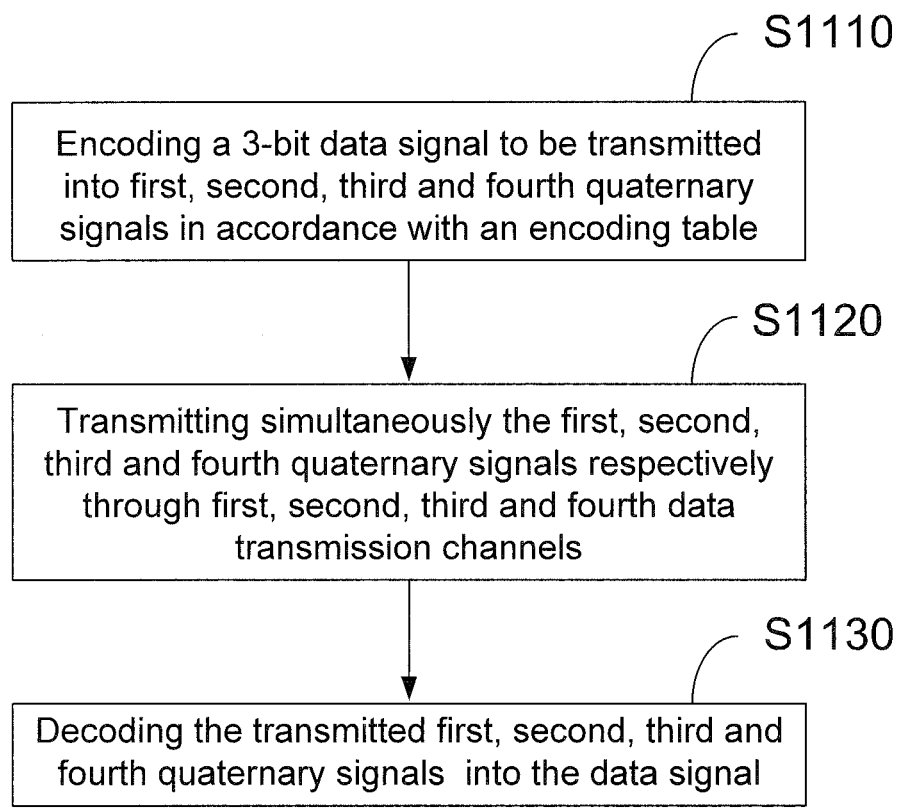
FIG. 11 shows schematically a flowchart of a 3B1Q method for high speed multi-level data transmission according to one embodiment of the present invention.

Referring now to FIG. 11, a flowchart of a 3B1Q method for high speed multi-level data transmission is shown according to one embodiment of the present invention, where a data signal with its length of three bits (3B) is transmitted in the form of four quaternary signals (1Q) simultaneously and respectively through four data transmission channels. As shown in FIG. 11, the 3B1Q method includes encoding a 3-bit data signal to be transmitted into first, second, third and fourth quaternary signals in accordance with an encoding table at step 1110.

The first, second, third and fourth quaternary signals are configured such that each of the first, second, third and fourth quaternary signals has three signal levels, and at the same time each of the first, second, third and fourth quaternary signals has a signal level different from that of the other three of the first, second, third and fourth quaternary signals. As such, the cumulative signal level of the first, second, third and fourth quaternary signals is zero, and thus, there is no EMI occurred during the data transmission.

According to one embodiment of the invention, the data signal is first converted into a stream of binary data segments with a data length of three bits. For example, each binary data segment is expressed as one of eight (8) binary permutations of the first bit, the second bit, and the third bit, (000), (001), (010), . . . , and (111). For a binary data segment "010", for example, the first bit of the binary data segment is "0", the second bit of the binary data segment is "1", and the third bit of the binary data segment is "0". The stream of binary data segments is then mapped onto the first, second, third and fourth quaternary signals in accordance with the encoding table, which is defined as below.

For the 3B1Q data transmission scheme, four quaternary level data are provided, and each of the four quaternary level data has a different level from the other three of the four quaternary level data. As shown in FIG. 12, the four quaternary level data comprise a +3 level data, a +1 level data, a −1 level data, and a −3 level data, with the signal level between each of the quaternary level data being the same level of 2, and thus, a cumulative signal level of the four quaternary level data is zero. Other values can also be assigned as data levels for practice of the invention. Since all four quaternary level data have different signal levels, permuting of the four quaternary level data generates twenty-four (24) quaternary permutations, as shown by (A, B, C, D) in the table of FIG. 12.

As disclosed above, the permutations (A, B, C, D) of the four quaternary level data are used for transmitting of the binary signal with the length of three bits. Of the twenty-four (24) quaternary permutations, eight (8) data permutations are used for encoding the 3-bit signal. Each of the eight data permutations corresponds to a binary number between 000 (decimal number of 0) and 111 (decimal number of 7). Additionally, each binary data segment may have a positive polarity and a negative polarity. Accordingly, as shown in FIG. 12, sixteen (16) permutations of the twenty-four quaternary permutations are used for encoding the 3-bit signal with the positive and negative polarities, while the other eight remaining quaternary permutations are used as control codes. Of the sixteen permutations, eight permutations are corresponding to the 3-bit signal with the positive polarity, while the other eight permutations are corresponding to the 3-bit signal with the negative polarity. For each of the eight positive data permutations, the corresponding polarity bit is a positive polarity bit, which is shown as "+" in the table of FIG. 12, and for each of the eight negative data permutations, the corresponding polarity bit is a negative polarity bit, which is shown as "−" in the table of FIG. 12. In other words, for each binary number, there is one corresponding positive data permutation and one negative data permutation. For example, the binary number "111" corresponds to the positive data permutation (3, 1, −1, −3) and the negative data permutation (3, −1, 1, −3), as shown in FIG. 12. The correspondence between the data permutations and the binary numbers defines a 3B1Q encoding table as shown in FIG. 12.

Once the 3B1Q encoding table is defined, the stream of binary data segments is mapped onto the first, second, third and fourth quaternary signals A, B, C and D in accordance with the encoding table, as shown in FIG. 12. According the 3B1Q encoding table, for example, a binary data segment "010" with a positive polarity is encoded the permutation (−1, 1, −3, 3) having the first, second, third and fourth quaternary signals A=−1, B=1, C=−3 and D=3, while a binary data segment "010" with a negative polarity is encoded the permutation (−1, 3, −3, 1) having the first, second, third and fourth quaternary signals A=−1, B=3, C=−3 and D=1.

Figures 13A, 13B:
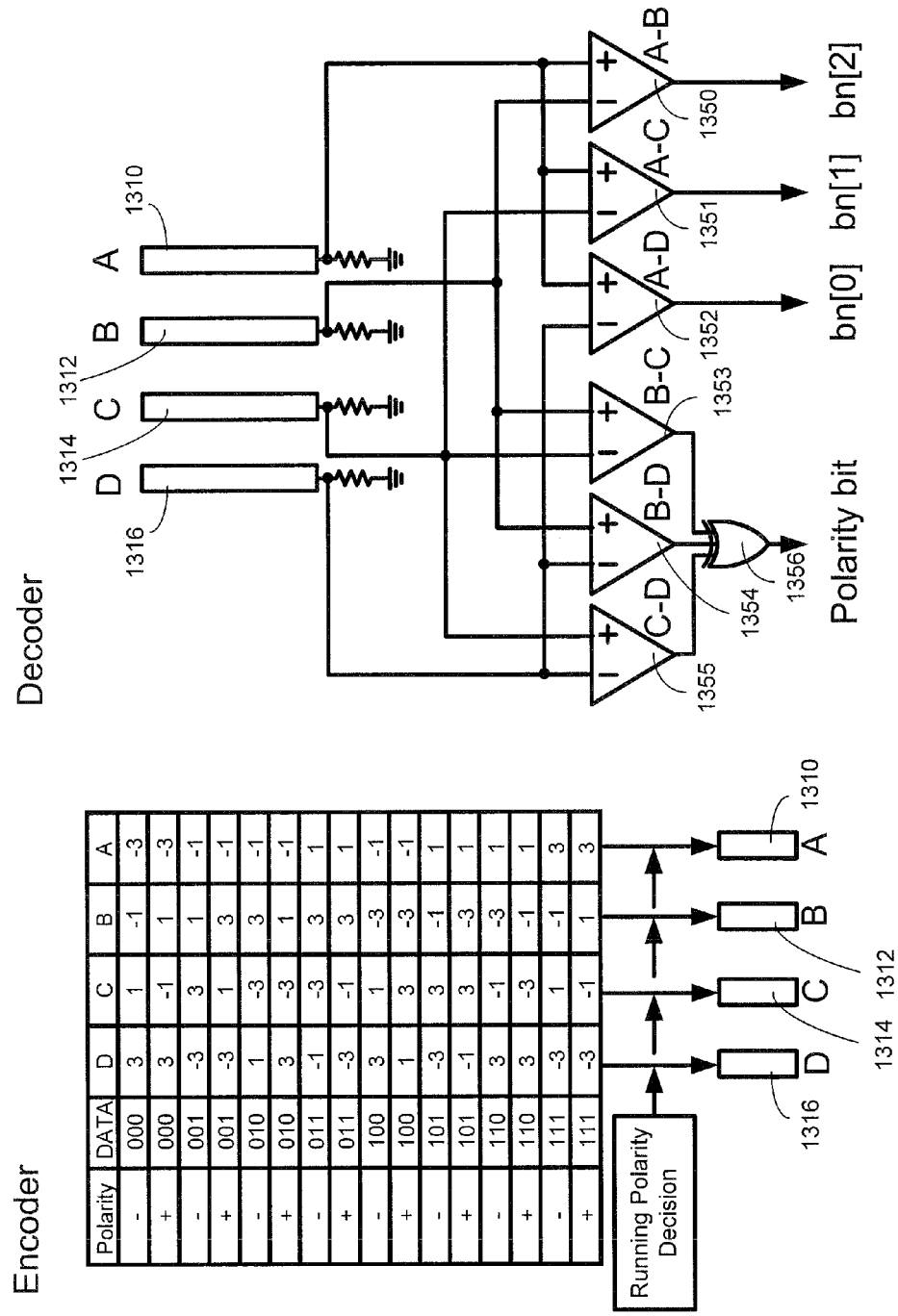
FIGS. 13A and 13B show schematically an encoder and a decoder, respectively, of a 3B1Q system for high speed multi-level data transmission according to one embodiment of the present invention.

FIG. 13A shows schematically an encoder of a 3B1Q system for high speed multi-level data transmission based on the encoding table according to one embodiment of the present invention. Similarly, each of the corresponding data permutations (A, B, C, D) can be treated as a corresponding state of a first quaternary signal A, a second quaternary signal B, a third quaternary signal C and a fourth quaternary signal D. For example, in the corresponding data permutation (1, 3, −1, −3), the first quaternary signal A is 1, the second quaternary signal B is 3, the third quaternary signal C is −1, and the fourth quaternary signal D is −3.

Then, in step S1120, the encoded first, second, third and fourth quaternary signals A, B, C and D are simultaneously transmitted through four data transmission channels 1310, 1312, 1314 and 1316, respectively. Similarly, the four data transmission channels 1310, 1312, 1314 and 1316 can be conductive wires/lines, data bus, optical fibers, or wireless data transmission means.

Figure 18:
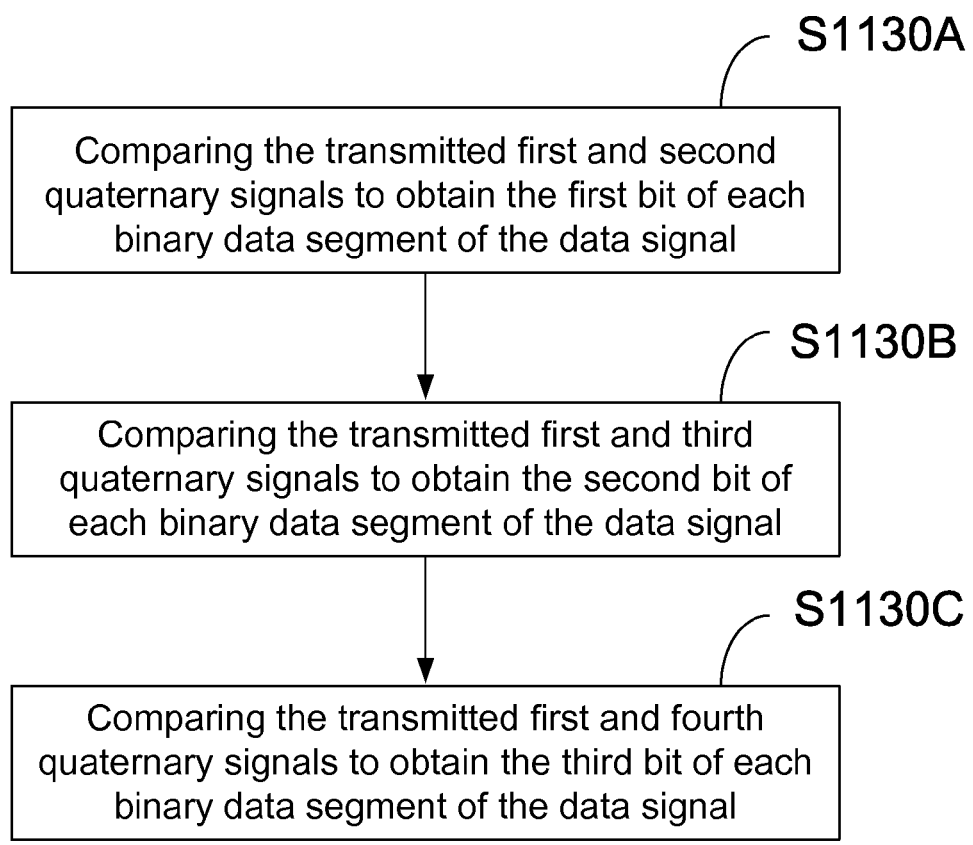
FIG. 18 shows schematically a flowchart of a decoding process according to one embodiment of the present invention.

The transmitted first, second, third and fourth quaternary signals A, B, C and D over the four data transmission channels 1310, 1312, 1314 and 1316 are decoded into the data signal at step S1130, for example, by a decoder, as shown in FIG. 13B. According to the present embodiment, the decoding/restoring process of the transmitted first, second, third and fourth quaternary signals A, B, C and D into the data signal can be achieved by comparisons of these transmitted quaternary signals A, B, C and D. FIG. 18 shows schematically the decoding/restoring process according to one embodiment of the invention. In the exemplary embodiment, the transmitted first and second quaternary signals are compared to obtain the first bit of each binary data segment of the data signal at step S1130A. At step S1130B, the transmitted first and third quaternary signals are compared to obtain the second bit of each binary data segment of the data signal. At step S1130C, the transmitted first and fourth quaternary signals are compared to obtain the third bit of each binary data segment of the data signal. It should be noted that these steps S1130A, S1130B and S1130C can be performed simultaneously or individually in any order.

In one embodiment, the relationship between a specific binary data segment and its corresponding data permutation is shown in FIG. 12, where the first quaternary signal A minus the second quaternary signal B corresponds to the first bit of the binary data segment, the first quaternary signal A minus the third quaternary signal C corresponds to the second bit of the binary data segment, the first quaternary signal A minus the fourth quaternary signal D corresponds to the third bit of the binary data segment, the second quaternary signal B minus the third quaternary signal C corresponds to a first intermediate bit, the second quaternary signal B minus the fourth quaternary signal D corresponds to a second intermediate bit, the third quaternary signal C minus the fourth quaternary signal D corresponds to a third intermediate bit, and an XOR result to first, second and third intermediate bits to obtain the polarity bit. As shown in FIG. 12, the XOR result is "0" when the polarity bit is "−" and "1" when the polarity bit is "+". The correspondence between the comparison of the quaternary signals and the bits of the binary data segment can be achieved by comparators. Specifically, if the comparison of the quaternary signals generates a positive value, the corresponding bit is "1", and if the comparison of the quaternary signals generates a negative value, the corresponding bit is "0". For example, in the corresponding data permutation (1, 3, −1, −3), the first quaternary signal A minus the second quaternary signal B is a negative value, which corresponds to the first bit "0" of the binary data segment "011", the first quaternary signal A minus the third quaternary signal C is a positive value, which corresponds to the second bit "1" of the binary data segment "011", the first quaternary signal A minus the fourth quaternary signal D is a positive value, which corresponds to the third bit "1" of the binary data segment "011", the second quaternary signal B minus the third quaternary signal C is a positive value, which corresponds to a first intermediate bit "1", the second quaternary signal B minus the fourth quaternary signal D is a positive value, which corresponds to a second intermediate bit "1", the third quaternary signal C minus the fourth quaternary signal D is also a positive value, which corresponds to a third intermediate bit "1", and an XOR result to first, second and third intermediate bits is "1", which corresponds to the polarity bit "+". In other words, the data permutation (1, 3, −1, −3) is a positive data permutation corresponding to the binary data segment "011".

In one embodiment, the decoding process can be achieved by comparators and an XOR gate, such as the comparators 1350, 1351, 1352, 1353, 1354 and 1355 and the XOR gate 1356 shown in FIG. 13B. In the exemplary embodiment, the first comparator 1350 compares the first quaternary signal A to the second quaternary signal B to obtain the first bit bn[2] of the binary data segment. The second comparator 1351 compares the first quaternary signal A to the third quaternary signal C to obtain the second bit bn[1] of the binary data segment. The third comparator 1352 compares the first quaternary signal A to the fourth quaternary signal D to obtain the third bit bn[0] of the binary data segment. The fourth comparator 1353 compares the second quaternary signal B to the third quaternary signal C to obtain the first intermediate bit. The fifth comparator 1354 compares the second quaternary signal B to the fourth quaternary signal D to obtain the second intermediate bit. The sixth comparator 1355 compares the third quaternary signal C to the fourth quaternary signal D to obtain the third intermediate bit. The XOR gate 1356 performs the XOR operation to the first, second and third intermediate bits to obtain the polarity bit bn[0] of the binary data segment.

According to the invention, only 16 permutations of the 24 quaternary permutations are used as the data permutations, and the other 8 quaternary permutations are used as control codes. Additionally, with proper encoding, the polarity bit corresponding to the data permutations can also be used to provide commands for the 3B1Q method.

Figure 14:
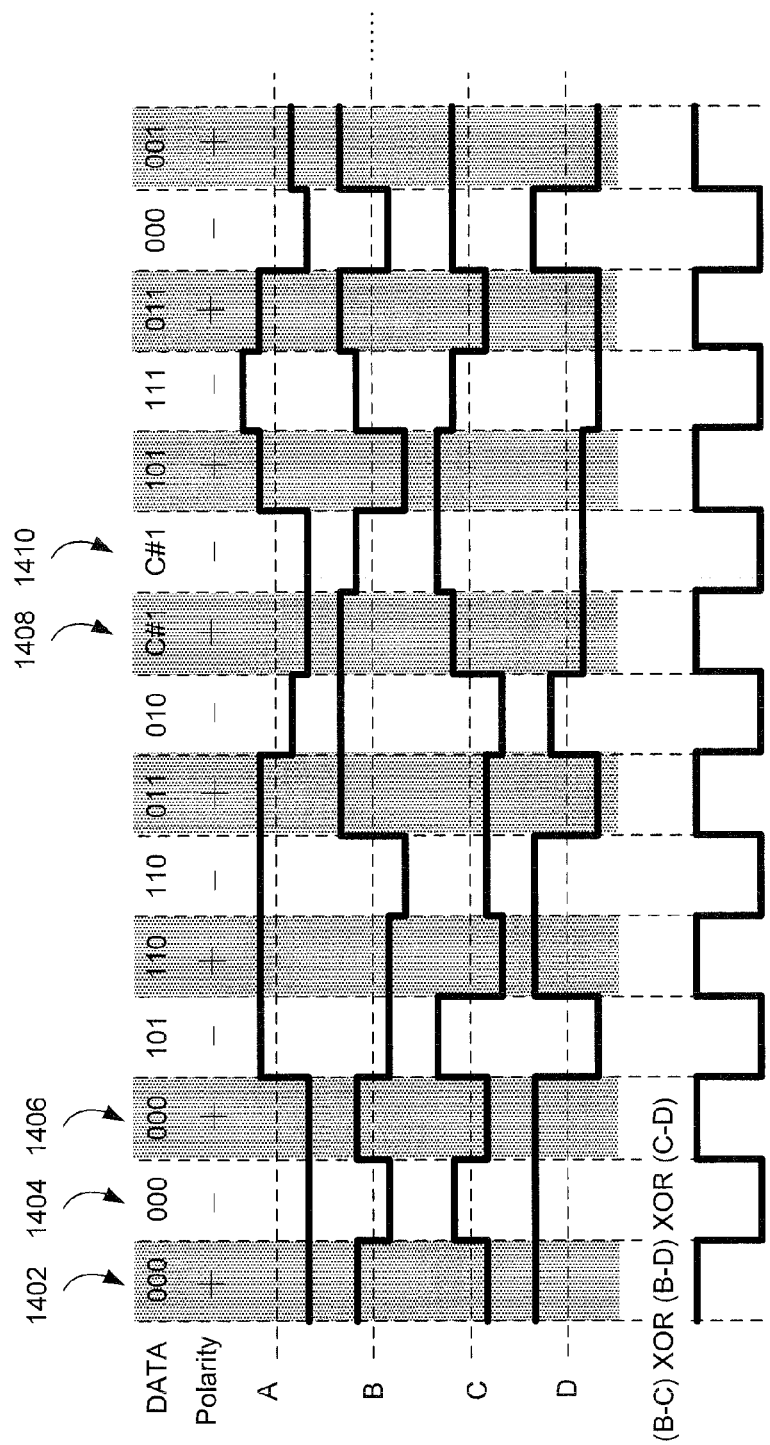
FIG. 14 shows schematically a diagram of the 3B1Q clock signaling according to one embodiment of the present invention.

FIG. 14 shows schematically a diagram of the 3B1Q clock signaling according to one embodiment of the present invention. The encoding of the binary data segment can be performed by converting the consecutive binary data segments alternatively to corresponding positive data permutations and corresponding negative data permutations. For example, as shown in FIG. 14, the first binary data segment 1402 is "000", and it is converted to the positive data permutation (−3, 1, −1, 3) according to the table in FIG. 12. The next consecutive binary data segment 1404 is also "000", and it is converted to the negative data permutation (−3, −1, 1, 3) according to the table in FIG. 12. The next consecutive binary data segment 1406 is also "000", and it is converted to the positive data permutation (−3, 1, −1, 3). Thus, for the three consecutive binary data segments 1402, 1404 and 1406, the XOR result would be alternative "1" and "0", as shown in FIG. 14. In this way, the polarity bits of the data permutations can be used for clock signaling and other commanding functions, and additional CDR circuits can be omitted.

In one embodiment, as shown in the table of FIG. 14, although the polarity bits of the data permutations are used for clock signaling, the command codes can also be used for other commanding functions. Accordingly, the command codes must also follow the same encoding approach with the polarity bits, which means all of the 8 additional permutations can include 4 positive command codes and 4 negative command codes, as shown in the table of FIG. 12, such that the same command can be provided with a positive command code and a negative command code. For example, as shown in FIG. 14, there are two consecutive command codes 1408 and 1410 provided with the same command C#1, and the first command code 1408 is (−3, 3, 1, −1) according to the table in FIG. 12, and the second command code 1410 is (−3, 1, 3, −1) according to the table in FIG. 12.

Further, when any of the additional permutations are used as the command code, the result of the first, second and third comparators 1350, 1351 and 1352 and the XOR gate 1356 may be the same as the result obtained from one of the data permutations. For example, the command code (−3, 1, 3, −1), which is shown as "Command #1", would generate the same result as the date permutation (−3, −1, 1, 3), which corresponds to the binary data segment of "000" with the polarity bit of "0".

Thus, each of the command code may be falsely recognized as a data permutation which represents a corresponding binary data segment. To avoid such confusion, additional steps may be provided to distinguish the command code from the data permutation. For example, the first, second and third intermediate bits obtained by the fourth, fifth and sixth comparators 1353, 1354 and 1355 may be used to check if the permutation being transmitted is a data permutation or a command code. Thus, confusion between the data permutations and the command codes can be avoided.

Figure 15A:
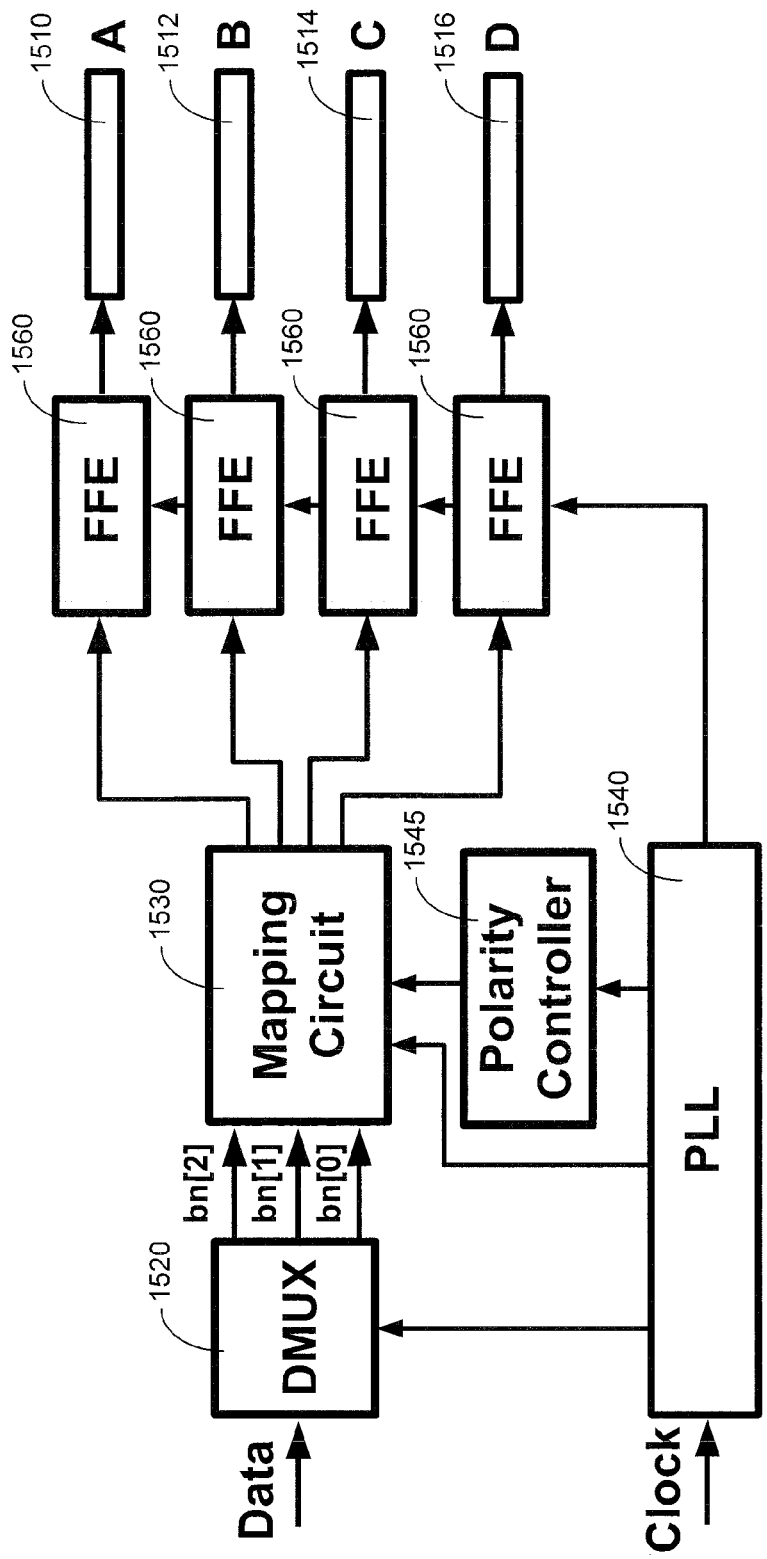
FIG. 15A shows schematically a block diagram of the transmitter of the 3B1Q system for high speed multi-level data transmission according to one embodiment of the present invention.
Figure 15B:
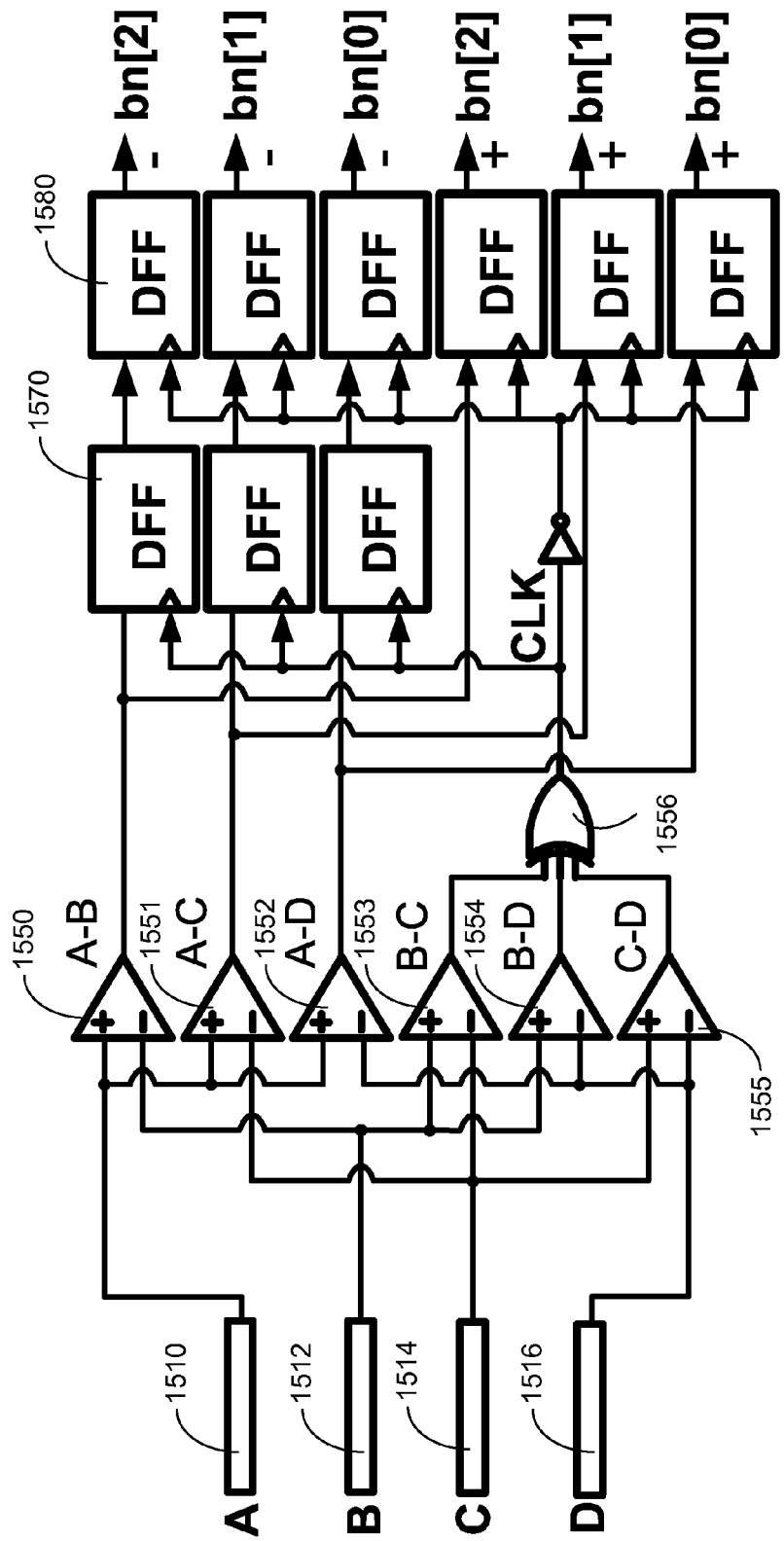
FIG. 15B shows schematically a block diagram of the receiver of the 3B1Q system for high speed multi-level data transmission according to one embodiment of the present invention.

Referring to FIGS. 15A and 15B, a transmitter and a receiver of the 3B1Q system for high speed multi-level data transmission are schematically shown according to one embodiment of the present invention. As shown in FIG. 15A, the transmitter includes an encoder, a PLL circuit 1540, a polarity controller 1545, and four FFEs 1560. Specifically, the encoder includes a DMUX 1520 and a mapping circuit 1530 electrically coupled to the DMUX 1520. Further, four signals lines including a first data transmission channel 1510, a second data transmission channel 1512, a third data transmission channel 1514 and a fourth data transmission channel 1516, are connected to the four FFEs 1560 respectively. As shown in FIG. 15B, the receiver includes a first comparator 1550, a second comparator 1551, a third comparator 1552, a fourth comparator 1553, a fifth comparator 1554, a sixth comparator 1555, an XOR gate 1556, three DFFs 1570 and six more DFFs 1580. The first comparator 1550 is electrically coupled to the first and second data transmission channels 1510 and 1512. The second comparator 1551 is electrically coupled to the first and third data transmission channels 1510 and 1514. The third comparator 1552 is electrically coupled to the first and fourth data transmission channels 1510 and 1516. The fourth comparator 1553 is electrically coupled to the second and third data transmission channels 1512 and 1514. The fifth comparator 1554 is electrically coupled to the second and fourth data transmission channels 1512 and 1516. The sixth comparator 1555 is electrically coupled to the third and fourth data transmission channels 1514 and 1516. The XOR gate 1556 is electrically coupled to the fourth, fifth and sixth comparators 1553, 1554 and 1555.

On the transmitter side, the encoder is used to convert a binary data segment with a data length of three bits, which is encoded into corresponding first, second, third and fourth quaternary signals A, B, C and D. Specifically, the DMUX 1520 is used to receive a data stream and convert the data stream to a plurality of the binary data segments, i.e., convert each of the binary data signals to the first bit bn[2], the second bit bn[1], and the third bit bn[0], and then output the first bit bn[2], the second bit bn[1], and the third bit bn[0] to the mapping circuit 1530. The mapping circuit 1530 then converts the received first bit bn[2], the second bit bn[1], and the third bit bn[0] to the corresponding first, second, third and fourth quaternary signals A, B, C and D in accordance with the encoding table of FIG. 12.

The PLL circuit 1540 and the polarity controller 1545 are provided to for the clock control. Specifically, the PLL circuit 1540 provides clock signals for clock signaling, and the polarity controller 1545 controls the mapping circuit 1530 to output alternative positive and negative data permutations. The four FFEs 1560 are provided for feed-forward control of the first, second, third and fourth quaternary signals A, B, C and D. The use of the PLL circuit 1540, polarity controller 1545 and the FFEs 1560 are known to the persons of ordinary skills in the art, and the description thereof is hereinafter omitted.

The first data transmission channel 1510, the second data transmission channel 1512, the third data transmission channel 1514 and the fourth data transmission channel 1516 are provided to transmit the first, second, third and fourth quaternary signals A, B, C and D, respectively from the transmitter to the receiver.

On the receiver side, the first comparator 1550 receives the first quaternary signal A and the second ternary signal B and generates the first bit bn[2] of the binary data signal based on comparison between the first quaternary signal A and the second quaternary signal B. More specifically, if the first quaternary signal A minus the second quaternary signal B is a positive value, the first bit bn[2] is "1", and the first quaternary signal A minus the second quaternary signal B is a negative value, the first bit bn[2] is "0". Similarly, the second comparator 1551 receives the first quaternary signal A and the third quaternary signal C and generates the second bit bn[1] of the binary data signal based on comparison between the first quaternary signal A and the third quaternary signal C. The third comparator 1552 receives the first quaternary signal A and the fourth quaternary signal D and generates the third bit bn[0] of the binary data signal based on comparison between the first quaternary signal A and the fourth quaternary signal D. The fourth comparator 1553 receives the second quaternary signal B and the third quaternary signal C and generates the first intermediate bit based on comparison between the second quaternary signal B and the third quaternary signal C. The fifth comparator 1554 receives the second quaternary signal B and the fourth quaternary signal D and generates the second intermediate bit based on comparison between the second quaternary signal B and the fourth quaternary signal D. The sixth comparator 1555 receives the third quaternary signal C and the fourth quaternary signal D and generates the third intermediate bit based on comparison between the third quaternary signal C and the fourth quaternary signal D. Further, the XOR gate 1556 receives the first, second and third intermediate bits and generates the polarity bit, which is used as a clock signal CLK, based on a result of the XOR operation to the first, second and third intermediate bits. Since the clock signal CLK is provided, no CDR circuit is required.

Three of the six DFFs 1580 (the three on the bottom of FIG. 15B) receives the clock signal CLK from the XOR gate 1556 and the corresponding bit signal from its corresponding comparators 1550, 1551 and 1552, and outputs the corresponding first bit bn[2], second bit bn[1], and third bit bn[0] with the polarity bit of 1, denoted by "+" in FIG. 15B. Similarly, the three DFFs 1570 receives the clock signal CLK from the XOR gate 1556 and the corresponding bit signal from its corresponding comparators 1550, 1551 and 1552, and outputs the corresponding first bit bn[2], second bit bn[1], and third bit bn[0] to the other three of the six DFFs 1580 (the three on the top of FIG. 15B) to form three sets of shift registers for the output of the first bit bn[2], second bit bn[1], and third bit bn[0] with the polarity bit of 0, denoted by "−" in FIG. 15B. Thus, XOR gate 1556 and the DFF 1570 and 1580 essentially replace the CDR circuit. The use of the DFF 1570 and 1580 is known to the persons of ordinary skills in the art, and detailed the description thereof is hereinafter omitted.

Figure 16:
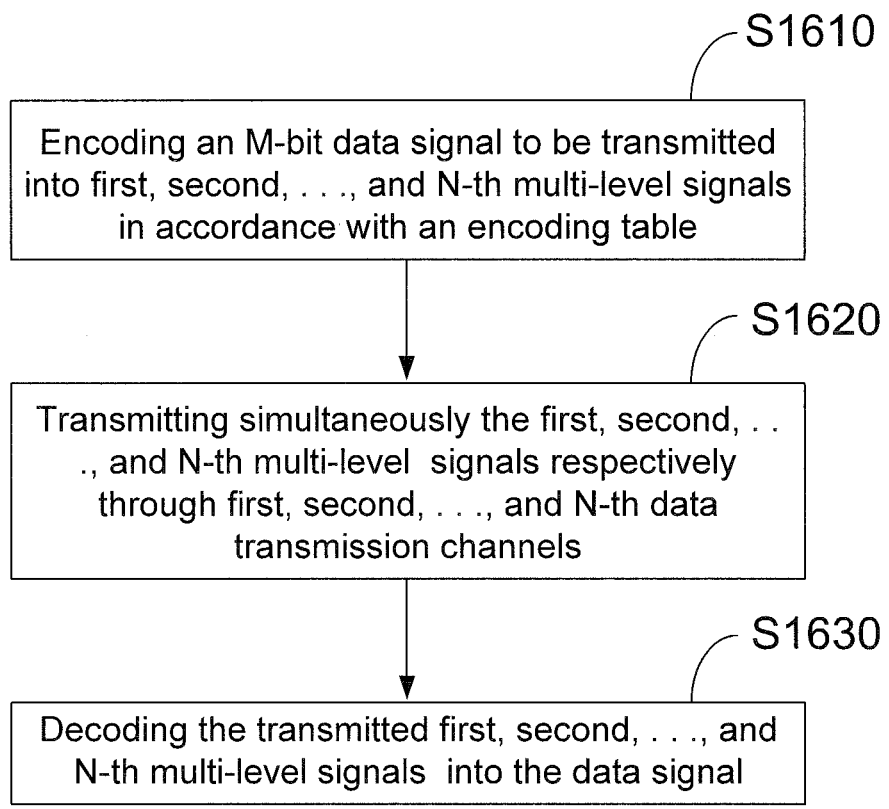
FIG. 16 shows schematically a flowchart of the method for high speed multi-level data transmission according to one embodiment of the present invention.

Referring now to FIG. 16, a flowchart of an M-bits and N-level method for high speed multi-level data transmission is shown according to one embodiment of the present invention. According to the method, a data signal with its length of M-bits is transmitted in the form of N multi-level signals simultaneously and respectively through N data transmission channels.

Specifically, at step S1610, a data signal to be transmitted encoded into N multi-level signals in accordance with an encoding table. The N multi-level signals are configured such that each multi-level signals has N signal levels, and at the same time each multi-level signal has a signal level different from that of the other (N−1) multi-level signals. Preferably, a cumulative signal level of the N multi-level data is zero. Since all signal levels of the N multi-level signals have different from each other, permuting of the signal levels of the N multi-level signals generates $P(N,N)$ multi-level permutations, where $P(N,N)=N!=N*(N-1)*(N-2)* \ldots *1$. For example, if ternary level data are used (N=3), $P(3,3)=6$, which means six ternary permutations will be obtained. If quaternary level data are used (N=4), P(4,4)=24, which means 24 quaternary permutations will be obtained.

In one embodiment, the data signal is first converted into a stream of binary data segments each of which has a data length of M bits comprising a first, second, . . . , and M-th bits, M, N being integers, N≥2, M≥2, and N!≥$2^M$, wherein each stream of binary data segment is corresponding to one of $2^M$ binary permutations of the first, second, . . . , and M-th bits. Then, the encoding table is defined, such that the $2^M$ binary permutations of the first, second, . . . , and M-th bits are respectively corresponding to $2^M$ multi-level permutations of the P(N, N) multi-level permutations of the signal levels of the N multi-level signals. Additionally, the other (N!–$2^M$) multi-level permutations of the P(N, N) multi-level permutations of the signal levels of the N multi-level signals are adapted as control codes. Similar, once the encoding table is defined, the stream of binary data segments is mapped onto the N multi-level signals in accordance with the defined encoding table.

At step S1620, the N multi-level signals are simultaneously transmitted through first, second, . . . , N-th data transmission channels, respectively, from a transmitter to a receiver of a data transmission system.

Figure 19:
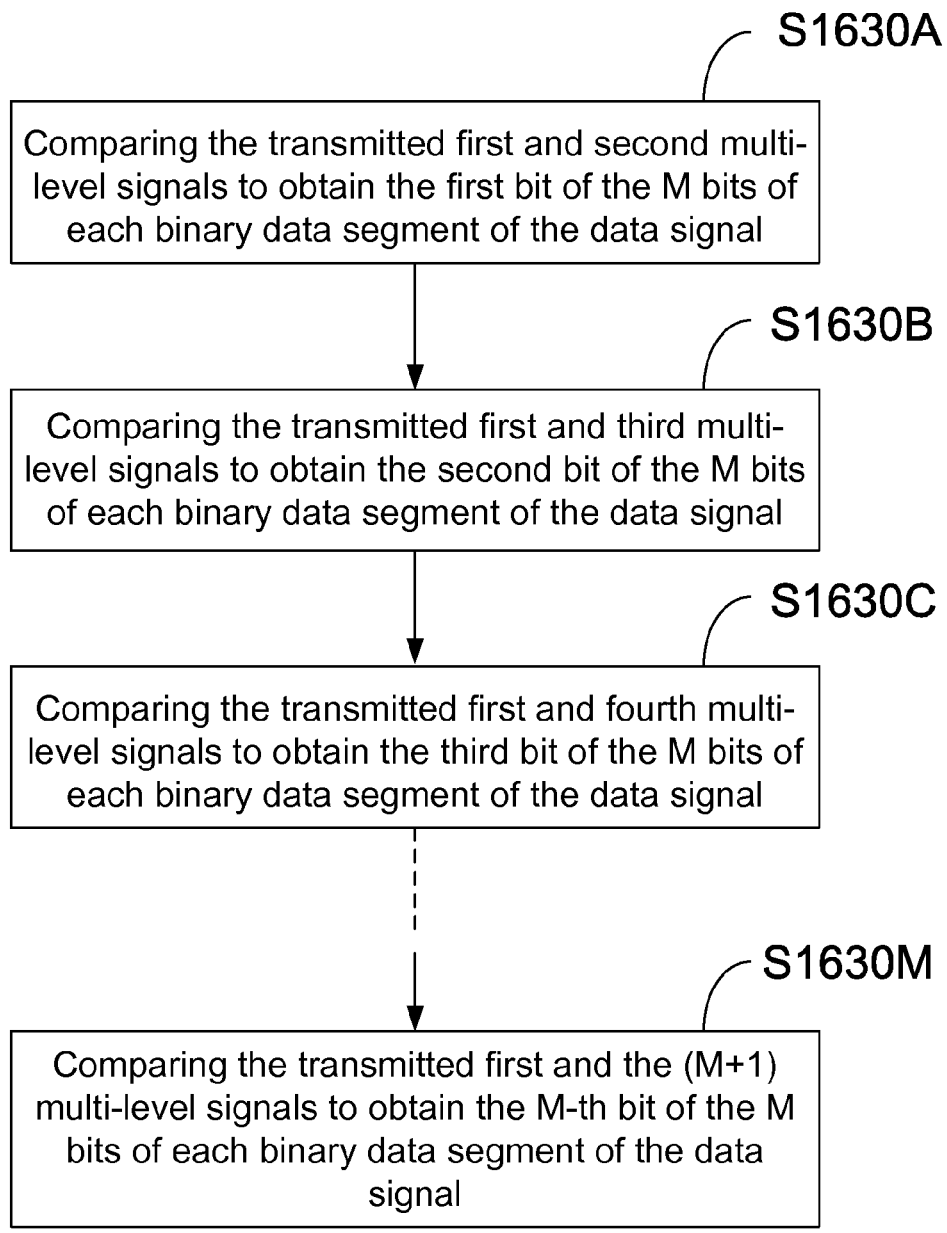
FIG. 19 shows schematically a flowchart of a decoding process according to one embodiment of the present invention.

The transmitted N multi-level signals are then decoded into the data signal, at step S1630. The decoding process in one embodiment is performed with comparing each two of the N multi-level signals transmitted through two corresponding data transmission channels to obtain a respective bit of the M bits of each binary data segment of the data signal based on comparison between the two corresponding multi-level signals. FIG. 19 shows schematically the decoding process according to one embodiment of the invention. In the exemplary embodiment, the transmitted first and second multi-level signals are compared to obtain the first bit of the M bits of each binary data segment of the data signal at step S1630A. At step S1630B, the transmitted first and third multi-level signals are compared to obtain the second bit of the M bits of each binary data segment of the data signal. At step S1630C, the transmitted first and fourth multi-level signals are compared to obtain the third bit of the M bits of each binary data segment of the data signal, . . . . At step S1630M, the transmitted first and the (M+1) multi-level signals are compared to obtain the M-th bit of the M bits of each binary data segment of the data signal. It should be noted that these steps S1630A, S1630B, S1630C, . . . and S1630M can be performed simultaneously or individually in any order.

Figure 17:
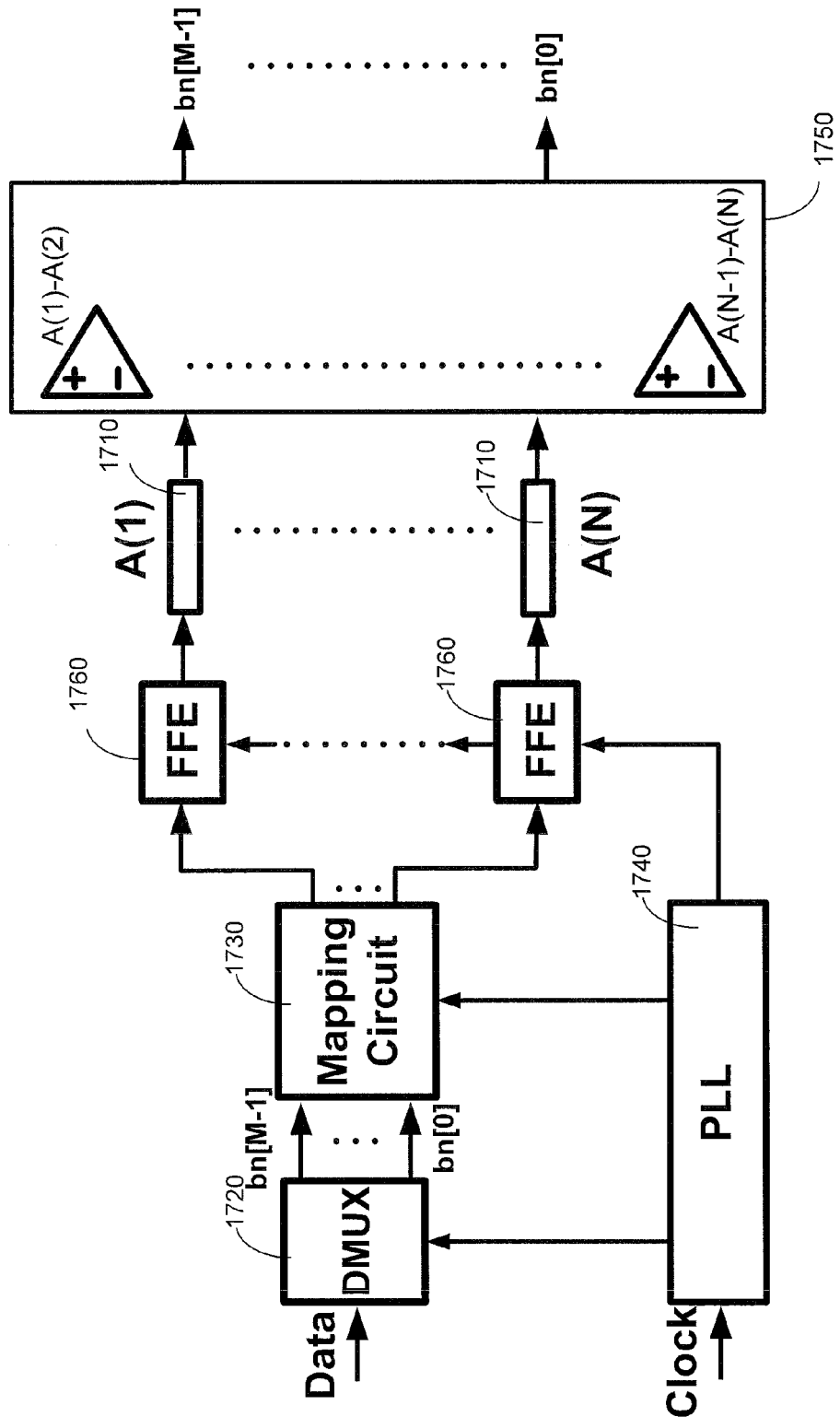
FIG. 17 shows schematically a block diagram of the system for high speed multi-level data transmission according to one embodiment of the present invention.

FIG. 17 shows schematically a block diagram of the system for high speed multi-level data transmission according to one embodiment of the present invention. The system includes an encoder, N data transmission channels 1710, a PLL circuit 1740, at least M comparators 1750, and a plurality of FFEs 1760. Specifically, the encoder includes a DMUX 1720 and a mapping circuit 1730 electrically coupled to the DMUX 1720.

The encoder is used to convert a binary data signal with a data length of M bits to corresponding N multi-level signals, where $2^M$<P(N,N). Specifically, the DMUX 1720 is used to receive a data stream of the binary data signals and convert each of the binary data signals to the M bits bn[0], bn[1], . . . , bn[M–1], and then output the M bits to the mapping circuit 1730. The mapping circuit 1730 then converts the M bits received to the corresponding N multi-level signals. Each of the N multi-level signals has a different signal level than the other N–1 of the N multi-level signals.

The PLL circuit 1740 is provided to for the clock control. Specifically, the PLL circuit 1740 provides clock signals for clock signaling to the mapping circuit 1730. The FFEs 1560 are provided for feed-forward control of the multi-level signals.

The N data transmission channels 1710 are electrically coupled to the FFE 1760 to transmit the N multi-level signals, respectively. The N data transmission channels 1710 can be conductive wires/lines, data bus, optical fibers, or wireless data transmission means. The at least M comparators 1750 are connected to the N data transmission channels 1710. In one embodiment, each comparator 1750 is connected to two of the N data transmission channels 1710 for receiving the two multi-level signals being transmitted by the two data transmission channels 1710, where the at least M comparators generates all of the M bits of each binary data signal based on comparison between the multi-level signals.

In brief, the present invention recites methods and systems of high speed data transmission that, among other things, encode a binary data signal into multiple multi-level signals transmitted over multiple data transmission channels, thus, the data transmission rate can be increased significantly. Further, because all multi-level signals have different signal levels with the other multi-level signals, there is no need to provide additional reference voltage as the reference signal for decoding the multi-level signals at the receiver, which greatly reduces the complexity of the circuitry design.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for data transmission, comprising the steps of:
   (a) encoding a data signal to be transmitted into first, second, third and fourth quaternary signals in accordance with an encoding table,
   wherein the data signal is characterized with a stream of binary data segments each of which has a data length of three bits comprising a first bit, a second bit and a third bit, thereby corresponding to one of eight binary permutations of the first, second and third bits; and
   wherein the first, second, third and fourth quaternary signals are configured such that each of the first, second, third and fourth quaternary signals has four signal levels, and at the same time each of the first, second, third and fourth quaternary signals has a signal level different from that of the other three of the first, second, third and fourth quaternary signals, whereby the signal levels of the first, second, third and fourth quaternary signals have twenty-four quaternary permutations;
   (b) transmitting simultaneously the first, second, third and fourth quaternary signals through first, second, third and fourth data transmission channels, respectively; and
   (c) decoding the transmitted first, second, third and fourth quaternary signals into the data signal, comprising:

comparing the transmitted first and second quaternary signals to obtain the first bit of each binary data segment of the data signal;

comparing the transmitted first and third quaternary signals to obtain the second bit of each binary data segment of the data signal; and comparing the transmitted first and fourth quaternary signals to obtain the third bit of each binary data segment of the data signal.

2. The method of claim 1, wherein a cumulative signal level of the first, second, third and fourth quaternary signals is zero.

3. The method of claim 1, wherein each binary data segment has a positive polarity and a negative polarity, and wherein the encoding table is defined such that the eight binary permutations with the positive and negative polarities are respectively corresponding to sixteen of the twenty-four quaternary permutations of the signal levels of the first, second, third and fourth quaternary signals.

4. The method of claim 3, wherein the encoding step comprises the steps of:

converting the data signal into the stream of binary data segments each of which has the data length of three bits comprising the first, second and third bits; and mapping the stream of binary data segments onto the first, second, third and fourth quaternary signals in accordance with the encoding table.

5. The method of claim 3, wherein the other eight of the twenty-four quaternary permutations of the signal levels of the first, second, third and fourth quaternary signals are adapted as control codes.

6. The method of claim 5, wherein the decoding step further comprises the steps of:

comparing the transmitted second and third quaternary signals to obtain a first intermediate bit;

comparing the transmitted second and fourth quaternary signals to obtain a second intermediate bit;

comparing the transmitted third and fourth quaternary signals to obtain a third intermediate bit; and performing an exclusive-or (XOR) operation to the first, second and third intermediate bits to obtain a clock signal.

7. A system for data transmission, comprising:

(a) an encoder for encoding a data signal to be transmitted into first, second, third and fourth quaternary signals in accordance with an encoding table, wherein the data signal is characterized with a stream of binary data segments each of which has a data length of three bits comprising a first bit, a second bit and a third bit, thereby corresponding to one of eight binary permutations of the first, second and third bits; and wherein the first, second, third and fourth quaternary signals are configured such that each of the first, second, third and fourth quaternary signals has four signal levels, and at the same time each of the first, second, third and fourth quaternary signals has a signal level different from that of the other three of the first, second, third and fourth quaternary signals, whereby the signal levels of the first, second, third and fourth quaternary signals have twenty-four quaternary permutations;

(b) first, second, third and fourth data transmission channels for transmitting simultaneously and respectively the first, second, third and fourth quaternary signals; and (c) a decoder for decoding the transmitted first, second, third and fourth quaternary signals into the data signal, comprising:

a first comparator electrically coupled to the first and second data transmission channels for receiving and comparing the transmitted first and second quaternary signals to obtain the first bit of each binary data segment of the data signal;

a second comparator electrically coupled to the first and third data transmission channels for receiving and comparing the transmitted first and third quaternary signals to obtain the second bit of each binary data segment of the data signal; and a third comparator electrically coupled to the first and fourth data transmission channels for receiving and comparing the transmitted first and fourth quaternary signals to obtain the third bit of each binary data segment of the data signal.

8. The system of claim 7, wherein a cumulative signal level of the first, second, third and fourth quaternary signals is zero.

9. The system of claim 7, wherein each binary data segment has a positive polarity and a negative polarity, and wherein the encoding table is defined such that the eight binary permutations with the positive and negative polarities are respectively corresponding to sixteen of the twenty-four quaternary permutations of the signal levels of the first, second, third and fourth quaternary signals.

10. The system of claim 9, wherein the encoder comprises:

a demultiplexer (DMUX) for converting the data signal into the stream of binary data segments each of which has the first, second and third and fourth bits and outputting the stream of binary data segments; and a mapping circuit electrically coupled to the DMUX for receiving the stream of binary data segments and converting the stream of binary data segments to the first, second, third and fourth quaternary signals in accordance with the encoding table.

11. The system of claim 9, wherein the decoder further comprises:

a fourth comparator electrically coupled to the second and third data transmission channels for receiving and comparing the transmitted second and third quaternary signals to obtain a first intermediate bit;

a fifth comparator electrically coupled to the second and fourth data transmission channels for receiving and comparing the transmitted second and fourth quaternary signals to obtain a second intermediate bit;

a sixth comparator electrically coupled to the third and fourth data transmission channels for receiving and comparing the transmitted third and fourth quaternary signals to obtain a third intermediate bit; and an exclusive-or (XOR) gate electrically coupled to the fourth, fifth and sixth comparators for receiving the first, second and third intermediate bits and performing an XOR operation to the first, second and third intermediate bits to obtain a clock signal.

12. A method for data transmission, comprising the steps of:

(a) encoding a data signal to be transmitted into N multi-level signals in accordance with an encoding table, wherein the data signal is characterized with a stream of binary data segments each of which has a data length of M bits comprising a first, second, . . . , and M-th bits, M, N being integers, $N>2$, $M \geq 2$, and $N! > 2^M$, wherein each stream of binary data segment is corresponding to one of $2^M$ binary permutations of the first, second, . . . , and M-th bits; and wherein the N multi-level signals are configured such that each multi-level signals has N signal levels, and at the same time each multi-level signal has a signal level different from that of the other (N−1) multi-level signals, whereby the signal levels of the N multi-level signals have P(N, N)=N! multi-level permutations;

(b) transmitting simultaneously the N multi-level signals through first, second, . . . , N-th data transmission channels, respectively; and (c) decoding the N multi-level signals into the data signal, comprising comparing each two of the N multi-level signals transmitted through two corresponding data transmission channels to obtain a respective bit of the M bits of each binary data segment of the data signal based on comparison between the two corresponding multi-level signals.

13. The method of claim 12, wherein a cumulative signal level of the N multi-level signals is zero.

14. The method of claim 12, wherein the encoding table is defined such that the $2^M$ binary permutations of the first, second, . . . , and M-th bits are respectively corresponding to $2^M$ multi-level permutations of the P(N, N) multi-level permutations of the signal levels of the N multi-level signals.

15. The method of claim 14, wherein the encoding step comprises the steps of:

converting the data signal into the stream of binary data segments each of which has the data length of M bits comprising the first, second, . . . , and M-th bits; and mapping the stream of binary data segments onto the first, second, . . . , and N multi-level signals in accordance with the encoding table.

16. The method of claim 14, wherein the other $(N!-2^M)$ multi-level permutations of the P(N, N) multi-level permutations of the signal levels of the N multi-level signals are adapted as control codes.

* * * * *